(12) United States Patent
Choi

(10) Patent No.: US 10,853,958 B2
(45) Date of Patent: Dec. 1, 2020

(54) METHOD AND DEVICE FOR ACQUIRING DEPTH INFORMATION OF OBJECT, AND RECORDING MEDIUM

(71) Applicant: SAMSUNG ELECTRONICS CO., LTD., Suwon-si (KR)

(72) Inventor: Sung-do Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 16/313,541

(22) PCT Filed: Feb. 7, 2017

(86) PCT No.: PCT/KR2017/001329
§ 371 (c)(1),
(2) Date: Dec. 27, 2018

(87) PCT Pub. No.: WO2018/004100
PCT Pub. Date: Jan. 4, 2018

(65) Prior Publication Data
US 2019/0244376 A1    Aug. 8, 2019

(30) Foreign Application Priority Data
Jun. 27, 2016 (KR) .................. 10-2016-0080237

(51) Int. Cl.
*G06T 7/536* (2017.01)
*G06T 7/593* (2017.01)
(Continued)

(52) U.S. Cl.
CPC ............. *G06T 7/536* (2017.01); *G06F 3/01* (2013.01); *G06F 3/011* (2013.01); *G06F 3/017* (2013.01);
(Continued)

(58) Field of Classification Search
CPC .. G06F 3/01; G06F 3/011; G06F 3/017; G06K 9/00624; G06T 7/536; G06T 7/593; H04N 5/262
See application file for complete search history.

(56) References Cited

U.S. PATENT DOCUMENTS 6,993,159 B1    1/2006  Ishii et al.
8,988,527 B2    3/2015  Haussmann et al.
(Continued)

FOREIGN PATENT DOCUMENTS

EP    2 453 384 A1    5/2012
JP    2003-141524 A    5/2003
(Continued)

OTHER PUBLICATIONS

International Search Report (PCT/ISA/210) dated May 22, 2017 issued by the International Searching Authority in International Application No. PCT/KR2017/001329.
(Continued)

*Primary Examiner* — Christopher E Leiby
(74) *Attorney, Agent, or Firm* — Sughrue Mion, PLLC

(57) ABSTRACT

Provided is a method of acquiring depth information of an object including acquiring first depth information of the object located at a first point in a common sensing region common to respective sensing regions of a plurality of sensors and first shape information of at least one view point, acquiring second shape information of the object at a second point when the object is located at the second point in a region excluding the common sensing region on the respective sensing regions of the plurality of sensors, and acquiring second depth information of the object at the second point based on a result of comparison between the first shape information of the at least one view point and the second shape information and the first depth information.

15 Claims, 16 Drawing Sheets

(51) Int. Cl.
*H04N 5/262* (2006.01)
*G06F 3/01* (2006.01)
*G06K 9/00* (2006.01)

(52) U.S. Cl.
CPC .......... *G06K 9/00624* (2013.01); *G06T 7/593* (2017.01); *H04N 5/262* (2013.01)

(56) References Cited

U.S. PATENT DOCUMENTS

| | | | |
|---|---|---|---|
| 10,438,036 B1* | 10/2019 | Reome | G06K 7/1491 |
| 2009/0213219 A1 | 8/2009 | Eggert et al. | |
| 2009/0268029 A1 | 10/2009 | Haussmann et al. | |
| 2011/0157009 A1 | 6/2011 | Kim et al. | |
| 2011/0221869 A1* | 9/2011 | Yamaya | G03B 35/08 348/47 |
| 2013/0063556 A1 | 3/2013 | Russell et al. | |
| 2013/0094705 A1* | 4/2013 | Tyagi | G06K 9/00369 382/103 |
| 2013/0229499 A1* | 9/2013 | Zhao | G06K 9/00355 348/51 |
| 2014/0184496 A1 | 7/2014 | Gribetz et al. | |
| 2015/0370321 A1 | 12/2015 | Lundberg | |

FOREIGN PATENT DOCUMENTS

| | | |
|---|---|---|
| JP | 2009-85651 A | 4/2009 |
| JP | 2010-510595 A | 4/2010 |
| KR | 2002-0033817 A | 5/2002 |
| KR | 10-2015-0108556 A | 9/2015 |

OTHER PUBLICATIONS

Written Opinion (PCT/ISA/237) dated May 22, 2017 issued by the International Searching Authority in International Application No. PCT/KR2017/001329.
Communication dated Jun. 5, 2019, issued by the European Patent Office in counterpart European Application No. 17820377.4.

* cited by examiner

FIG. 9
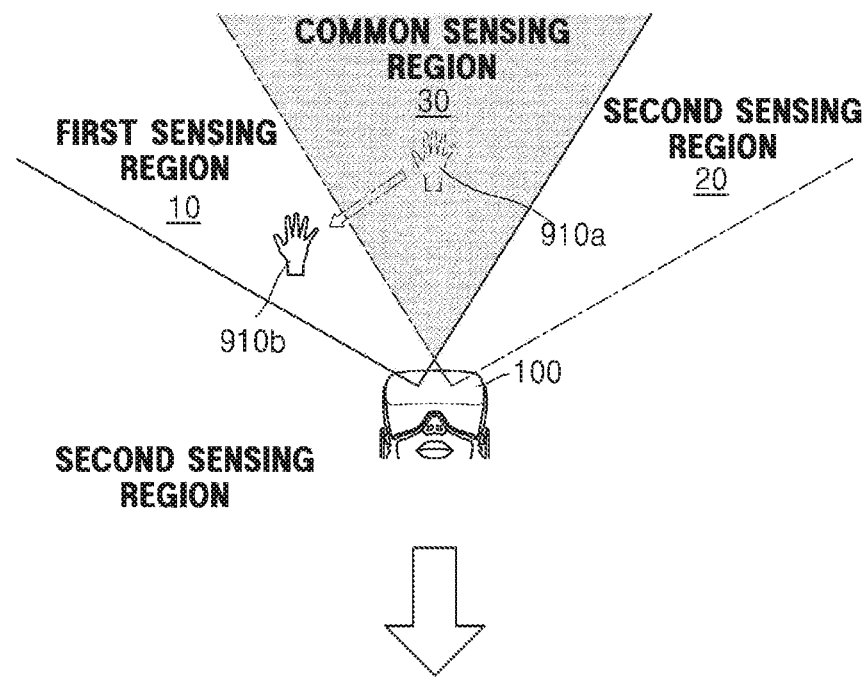
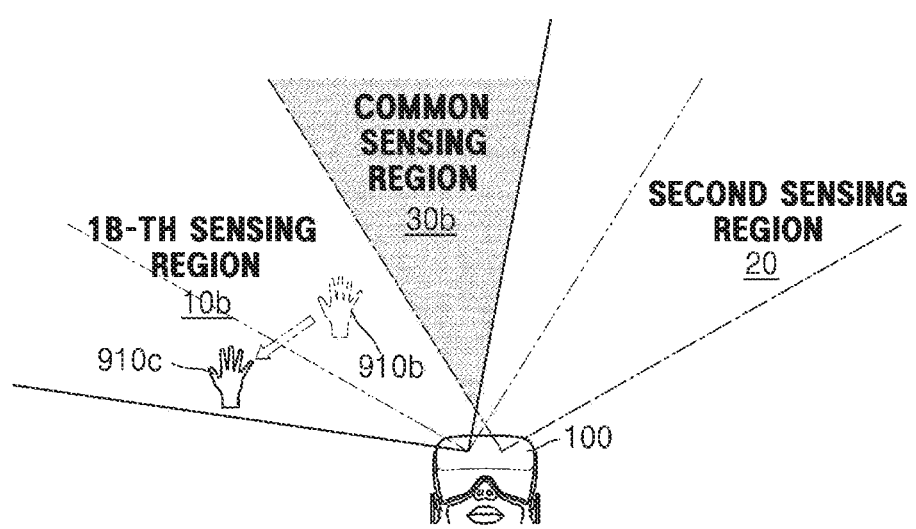

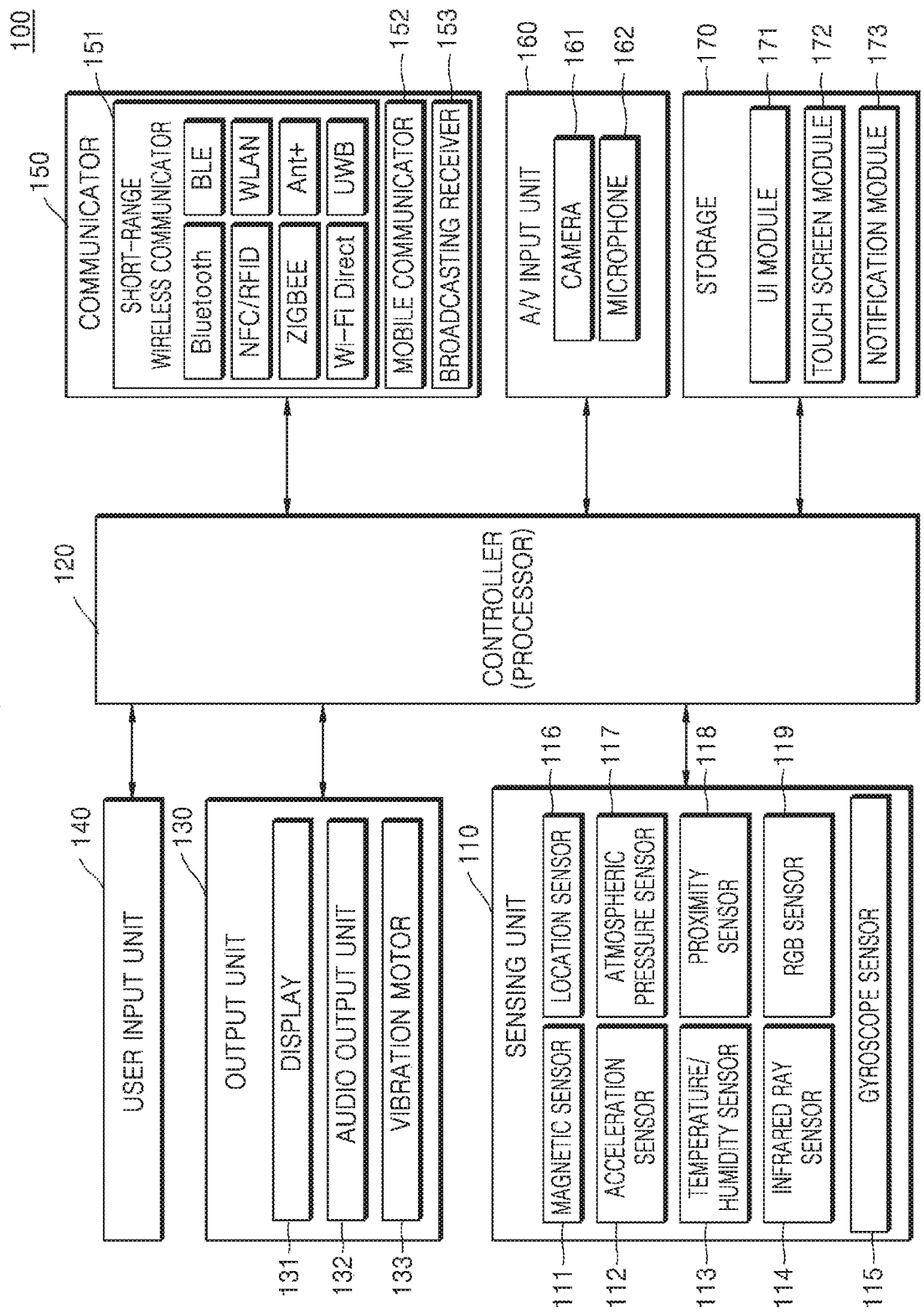

METHOD AND DEVICE FOR ACQUIRING DEPTH INFORMATION OF OBJECT, AND RECORDING MEDIUM

TECHNICAL FIELD

The present disclosure relates to a method of acquiring depth information of an object, a device for acquiring depth information of an object, and a recording medium having recorded thereon a program for performing a method of acquiring depth information of an object.

BACKGROUND ART

According to the development of information and technology (IT), an electronic device may recognize the motion of a user or the movement of an object, interpret the motion of the user or the movement of the object as an input signal, and operate in response to the analyzed input signal. Accordingly, the electronic device needs to extract three-dimensional (3D) information of the motion of the user or the movement of the object by using a camera.

To control the electronic device, the necessity of depth information, which is 3D information, has increased. Recently, various techniques for extracting the 3D information have been actively studied. For example, there has been developed a technique of acquiring a stereo image by projecting light on a scene including a subject and performing stereo matching image processing on the acquired image to acquire the 3D information.

DESCRIPTION OF EMBODIMENTS

Technical Problem

Provided are a method and a device for acquiring depth information of an object and a recording medium thereof.

Solution to Problem

According to an aspect of the present disclosure, a method of acquiring depth information of an object includes acquiring first depth information of the object located at a first point in a common sensing region common to respective sensing regions of a plurality of sensors and first shape information of at least one view point, acquiring second shape information of the object at a second point when the object is located at the second point in a region excluding the common sensing region on the respective sensing regions of the plurality of sensors, and acquiring second depth information of the object at the second point based on a result of comparison between the first shape information of the at least one view point and the second shape information and the first depth information.

BRIEF DESCRIPTION OF DRAWINGS

FIG. 9 is a diagram for describing a method performed by a device of changing a sensing region of at least one of a plurality of sensors according to a movement of an object according to an embodiment.

FIGS. 15 and 16 are block diagrams of a device for acquiring depth information according to an embodiment.

BEST MODE

Figure 1:
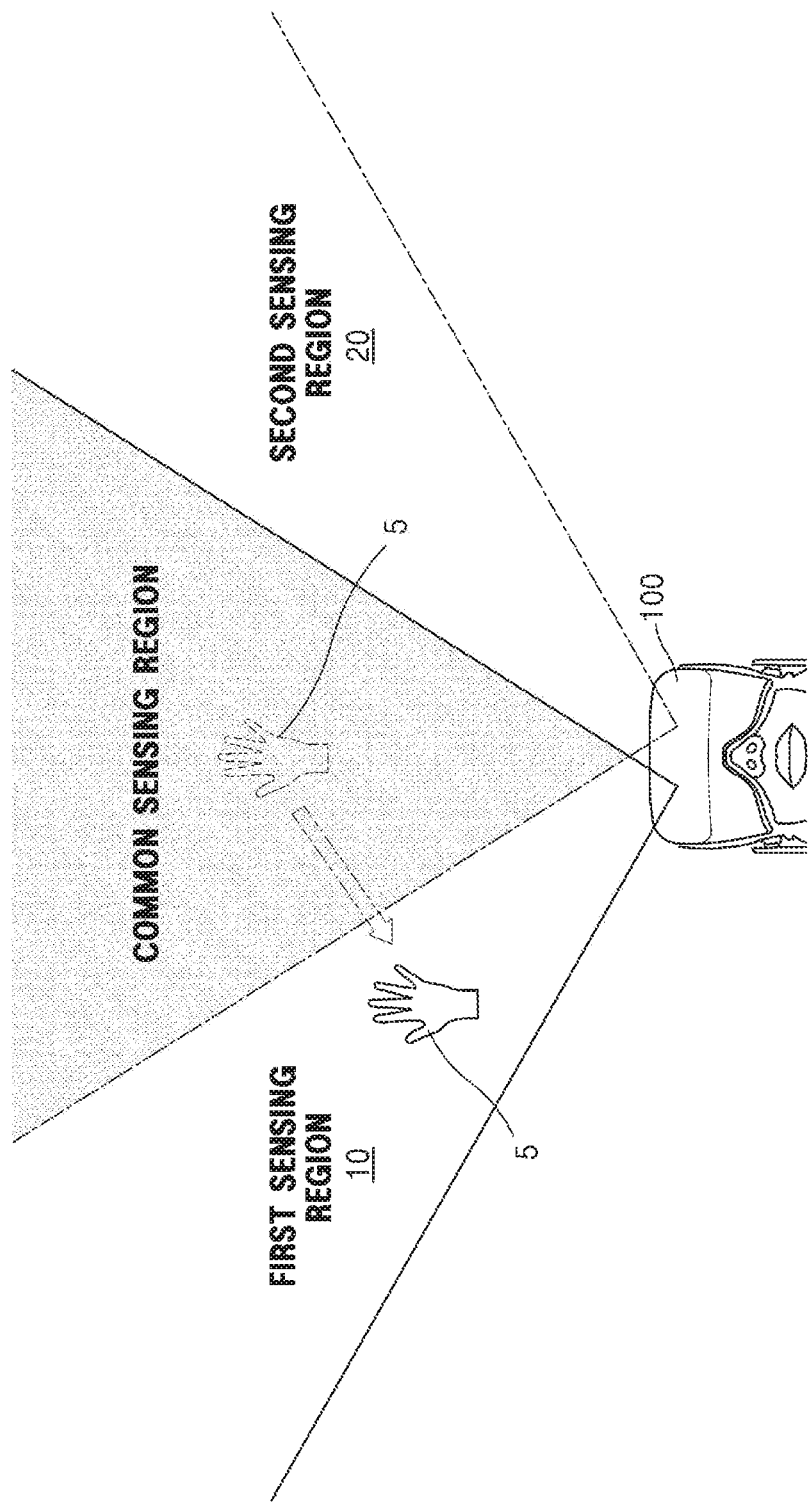
FIG. 1 is a conceptual diagram for describing a method, performed by a device, of acquiring depth information of an object according to an embodiment.

According to an aspect of the present disclosure, a method, performed by a device, of acquiring depth information of an object includes acquiring first shape information of at least one view point of the object located at a first point in a common sensing region common to respective sensing regions of a plurality of sensors and first depth information; acquiring second shape information of the object at a second point when the object is located at the second point in a region excluding the common sensing region on the respective sensing regions of the plurality of sensors; and acquiring second depth information of the object at the second point based on a result of comparison between the first shape information of the at least one view point and the second shape information and the first depth information.

The method may further include selecting first shape information of a view point corresponding to the second shape information from among the first shape information of the at least view point; and determining a size difference of the object sensed at the first point and the second point, based on the selected first shape information and the second shape information, wherein the acquiring of the second depth information includes: determining the second depth information based on the determined size difference and the first depth information.

The method may further include generating a three-dimensional (3D) model of the object, wherein the first shape information of the at least one view point is acquired from the generated 3D model of the object.

The method may further include acquiring location information of the object; and determining whether the object is located at the second point in the region excluding the common sensing region based on the acquired location information on the respective sensing regions of the plurality of sensors.

The acquiring of the first shape information of the at least one view point may include when a shape of the object is deformable, acquiring the first shape information of the at least one view point according to a type of the deformable shape.

The method may further include sensing a shape change of the object in the common sensing region and determining the type of the deformable shape based on a result of sensing.

The method may further include when the object is located within a predetermined distance range from a boundary of the respective sensing regions of the plurality of sensors, changing a sensing region of at least one of the plurality of sensors based on a moving direction of the object.

The method may further include identifying a type of the object based on the first shape information of the at least one view point; and storing the first shape information of the at least one view point and the first depth information according to the identified type of the object.

The method may further include expanding a user interface capable of sensing an input of a user of the device set in a region of the common sensing region to the respective sensing regions of the plurality of sensors when the first shape information of the at least one view point and the first depth information are acquired.

According to another aspect of the present disclosure, a device for acquiring depth information of an object includes a sensing unit configured to sense the object located at a first point in a common sensing region common to respective sensing regions of a plurality of sensors, acquire first shape information of at least one view point of the object located at the first point and, when the object is located at a second point in a region excluding the common sensing region, second shape information of the object at the second point on the respective sensing regions of the plurality of sensors; and a controller configured to acquire first depth information of the object at the first point and, based on a result of comparison between the first shape information of the at least one view point and the second shape information and the first depth information, second shape information of the object at the second point.

The controller may be further configured to select first shape information of a view point corresponding to the second shape information from among the first shape information of the at least view point, determine a size difference of the object sensed at the first point and the second point, based on the selected first shape information and the second shape information, and determine the second depth information based on the determined size difference and the first depth information.

The controller may be further configured to generate a three-dimensional (3D) model of the object, wherein the first shape information of the at least one view point is acquired from the generated 3D model of the object.

The sensing unit may be further configured to acquire location information of the object and the controller may be further configured to determine whether the object is located at the second point in the region excluding the common sensing region based on the acquired location information on the respective sensing regions of the plurality of sensors.

The controller may be further configured to, when a shape of the object is deformable, acquire the first shape information of the at least one view point according to a type of the deformable shape. The sensing unit may be further configured to sense a shape change of the object in the common sensing region and the controller may be further configured to determine the type of the deformable shape based on a result of sensing.

The controller may be further configured to, when the object is located within a predetermined distance range from a boundary of the respective sensing regions of the plurality of sensors, change a sensing region of at least one of the plurality of sensors based on a moving direction of the object. The controller may be further configured to identify a type of the object based on the first shape information of the at least one view point, and the device may store the first shape information of the at least one view point and the first depth information according to the identified type of the object.

The controller may be further configured to expand a user interface capable of sensing an input of a user of the device set in a region of the common sensing region to the respective sensing regions of the plurality of sensors when the first shape information of the at least one view point and the first depth information are acquired.

MODE OF DISCLOSURE

Terms used in this specification will now be briefly described before describing embodiments in detail.

Although the terms used in the disclosure have been described in general terms that are currently used in consideration of the functions referred to in the disclosure, they are intended to encompass various other terms depending on the intent of those skilled in the art, precedents, or the emergence of new technology. Accordingly, the terms used in the disclosure are not defined based on the meaning of the term, not on the name of a simple term, but on the contents throughout the disclosure.

It will be understood that the terms "comprises", "comprising", "includes" and/or "including", when used herein, specify the presence of stated elements, but do not preclude the presence or addition of one or more other elements. The terms "unit", "module", etc. used herein may mean a unit processing at least one function or operation and may be implemented as hardware or software or may be implemented as a combination of software and hardware.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. In the following description, for clarity, parts or elements that are not related to the embodiments are omitted.

FIG. 1 is a conceptual diagram for describing a method performed by a device 100 of acquiring depth information of an object 5 according to an embodiment.

The device 100 according to an embodiment may include a plurality of sensors. Here, the plurality of sensors may include an image sensor that senses the object 5 and converts information about a shape, a color, and the like of the object 5 into an electrical image signal. In addition, different sensing regions may be respectively set for the plurality of sensors. For example, a first sensing region 10 may be set to a first one of the plurality of sensors, and a second sensing region 20 may be set to a second one of the plurality of sensors. Here, the sensing region may correspond to a field of view of the image sensor. In addition, the sensing regions of the plurality of sensors may include a sensing region common to each other. In the present specification, the sensing region common to the sensing regions of the plurality of sensors is described as a common sensing region 30.

Meanwhile, in FIG. 1, the plurality of sensors are provided in the device 100, but this is merely an embodiment. The plurality of sensors may be provided outside the device 100.

The device 100 may acquire shape information and depth information of the object 5 when the object 5 is located at a first point in the common sensing region 30. The shape information of the object 5 acquired by the device 100 may indicate a shape of the object 5. In addition, the depth information of the object 5 acquired by the device 100 may be information indicating a distance between the device 100 and the object 5.

The device 100 may acquire the depth information of the object 5 by using parallax between images of the object 5 acquired from the first sensor and the second sensor. For example, with respect to an object located relatively far from the first sensor and the second sensor, the parallax between the images acquired by the first sensor and the second sensor is small, but with respect to an object located relatively close to the first sensor and the second sensor, the parallax between the images acquired by the first sensor and the second sensor may be large. Using this principle, the device 100 may acquire the depth information of the object 5 located in the common sensing region 30.

On the other hand, the shape information of the object 5 acquired by the device 100 may differ depending on view points at which the object 5 is sensed by the plurality of sensors. For example, the shape information acquired when the device 100 senses a front surface of the object 5 and when the device 100 senses a side surface of the object 5 may be different from each other. Accordingly, the device 100 may identify and store the shape information of the object 5 located in the common sensing region 30 according to at least one view point.

Meanwhile, according to another embodiment, the device 100 may generate a three-dimensional (3D) model of the object 5 and acquire the shape information of at least one view point from the generated 3D model.

The device 100 according to an embodiment may trace a location of the object 5. The device 100 may trace the location of the object 5 to determine whether the object 5 is located in a region excluding the common sensing region 30 on the first and second sensing regions 10 and 20 of the plurality of sensors. The device 100 may also acquire the shape information of the object 5 when the object 5 is located in the region excluding the common sensing region 30 on the first and second sensing regions 10 and 20 of the plurality of sensors. Here, for convenience of description, the shape information acquired when the object 5 is located in the common sensing region 30 is described as first shape information, and the shape information acquired when the object 5 is located in the region excluding the common sensing region 30 is described as second shape information. Also, the depth information acquired when the object 5 is located in the common sensing region 30 is described as first depth information.

When the object 5 is out of the common sensing region 30, since the second shape information of the object 5 is sensed in only one of the plurality of sensors provided in the device 100, it may be difficult to acquire the depth information of the object 5 according to the same principle.

Accordingly, the device 100 according to an embodiment may acquire second depth information of the object 5 located at a point out of the common sensing region 30, based on a result of comparison between the first shape information acquired from at least one view point and the second shape information and the first depth information. For example, the device 100 may select the first shape information corresponding to the second shape information from among the first shape information acquired from the at least one view point. The device 100 may acquire the second depth information of the object 5 located at the point out of the common sensing region 30 based on a magnitude difference between the selected first shape information and the second shape information and the first depth information. This will be described later in more detail with reference to FIG. 3.

Meanwhile, the device 100 according to an embodiment may be implemented in various forms. For example, the device 100 described herein may be a mobile phone, a smart phone, a laptop computer, a tablet PC, an electronic book terminal, a digital broadcast terminal, a personal digital assistant (PDA), a portable multimedia player, navigation, a smart TV, a smart car, a consumer electronics (CE) device (e.g., a refrigerator and an air conditioner with a display panel), and a head mounted display (HMD), etc. but is not limited thereto.

Figure 2:
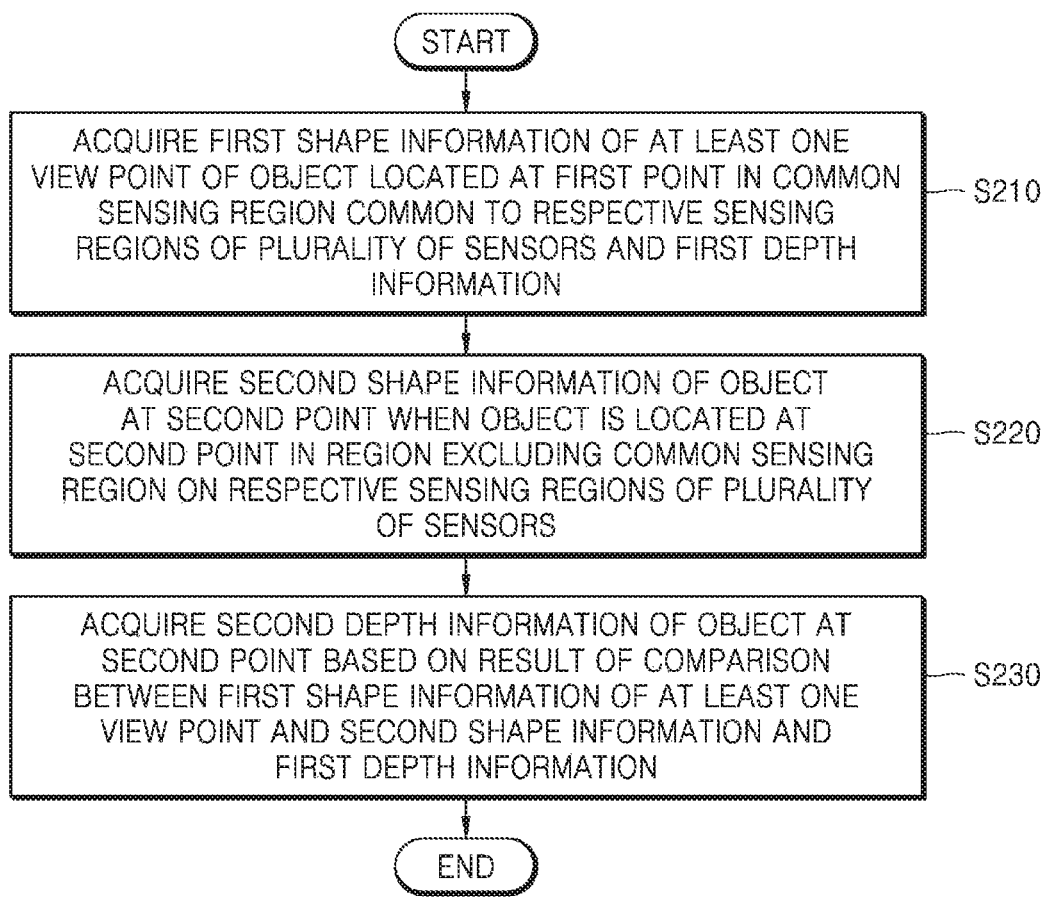
FIG. 2 is a flowchart illustrating a method performed by a device of acquiring depth information of an object according to an embodiment.

FIG. 2 is a flowchart illustrating a method performed by a device of acquiring depth information of an object according to an embodiment.

In operation S210, the device may acquire first shape information of at least one view point of the object located at a first point in a common sensing region between sensing regions of a plurality of sensors and first depth information.

For example, the device may acquire an image of the object located in the common sensing region from each of a first sensor and a second sensor included in the plurality of sensors. The device may acquire the first shape information of the at least one view point of the object from the image of the object acquired from the first sensor and the image of the object acquired from the second sensor.

The device may also compare the image of the object acquired from the first sensor with the image of the object acquired from the second sensor to acquire the first depth information of the object located in the common sensing region. Here, the device may use a stereo type depth estimation method to acquire the first depth information of the object.

On the other hand, according to a state of the object in the common sensing region, view points at which the object is sensed from each of the plurality of sensors may be different. Accordingly, the device may identify and store shape information of the object located in the common sensing region according to at least one view point.

In operation S220, the device may acquire second shape information of the object at a second point on the respective sensing regions of the plurality of sensors when the object is located at the second point in a region excluding the common sensing region.

The device according to an embodiment may trace a location of the object to determine whether the object is out of the common sensing region. As a result of determination, the device may acquire the second shape information of the object when the object is out of the common sensing region. For example, the device may acquire the second shape information of the object at the second point when the object is located at the second point in the region excluding the common sensing region on the sensing region of a first one of the plurality of sensors.

In operation S230, the device may acquire the second depth information of the object at the second point based on a result of comparison between the first shape information of the at least one view point and the second shape information and the first depth information.

The device according to an embodiment may select first shape information at a view point corresponding to the second shape information from among the first shape information acquired at the at least one view point. The device may determine a size difference of the object sensed at the first point and the second point based on the selected first shape information and the second shape information. The device may also acquire the second depth information of the object at the second point by using the determined size difference of the object at the first point and the second point and the first depth information.

For example, when the size of the object at the first point is a1, the size of the object at the second point is a2, and a distance between the object and the device at the first point is d1, a distance between the object and the device at the second point may be determined as $d1*(a2/a1)$.

Even when it is difficult to acquire the depth information of the object in a stereo manner since the object is located at the second point in the region excluding the common sensing region on the sensing regions of the plurality of sensors, the device according to an embodiment may acquire the second depth information of the object by using the first shape information and the first depth information of the object located in the common sensing region as described above.

Figure 3:
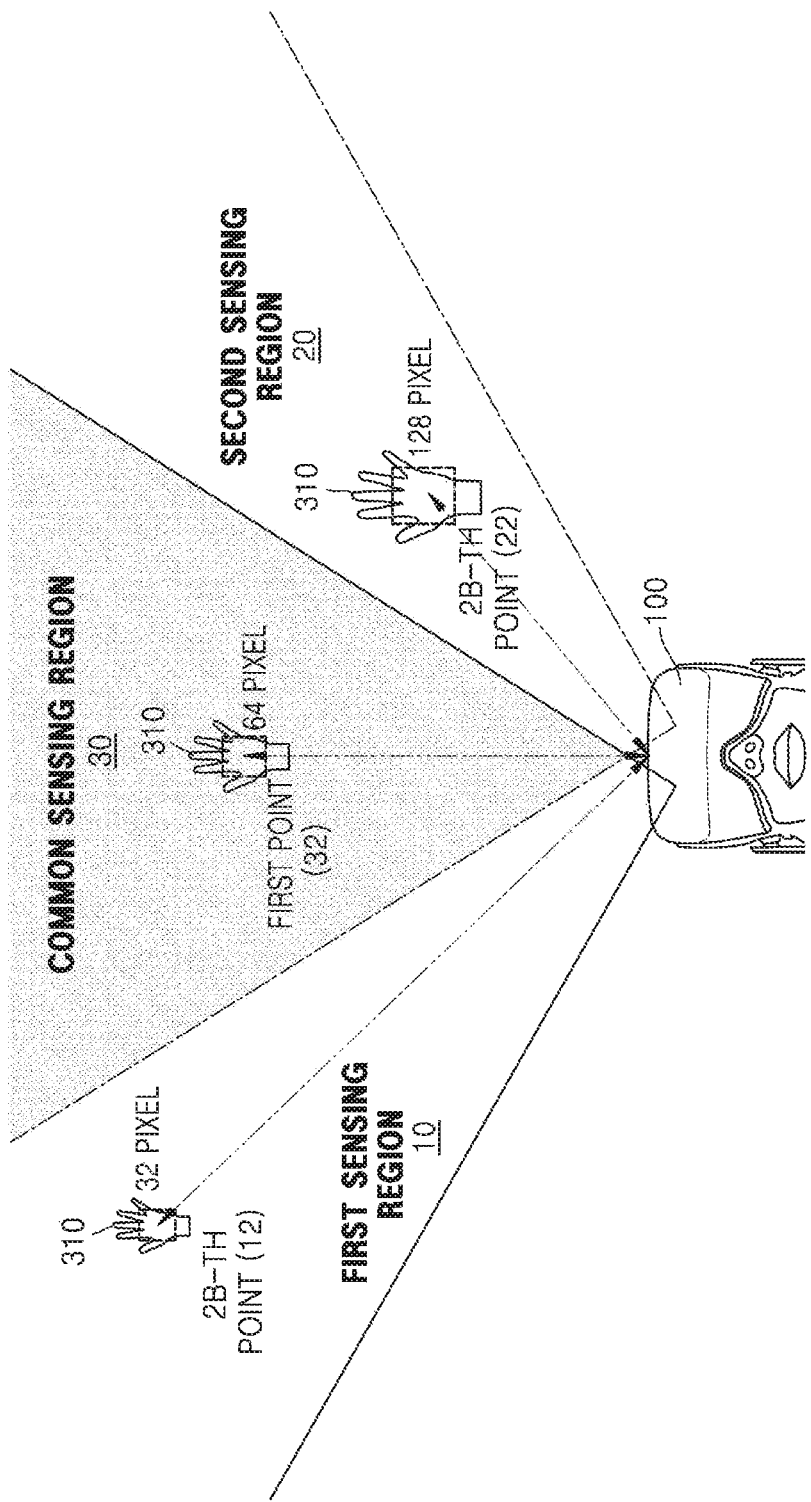
FIG. 3 is a diagram for more specifically describing a method performed by a device of acquiring depth information of an object according to an embodiment.

FIG. 3 is a diagram for more specifically describing a method performed by the device 100 of acquiring depth information of an object according to an embodiment.

Referring to FIG. 3, the device 100 may acquire first shape information and first depth information of a hand 310 located at a first point 32 in the common sensing region 30.

The device 100 may acquire second shape information of the hand 310 when the hand 310 is located at a 2a-th point 12 in the first sensing region 10 out of the common sensing region 30.

The device 100 may compare the first shape information to the second shape information to determine a size difference of the hand 310 sensed at the first point 32 and the 2a-th point 12. When the size of a palm part of the hand 310 sensed at the first point 32 corresponds to 64 pixels and the size of a palm part of the hand 310 sensed at the 2a-th point 12 corresponds to 32 pixels, the device 100 may determine that the size of the hand 310 sensed at the first point 32 is two times greater than the size of the hand 310 sensed at the 2a-th point 12. The device 100 may also acquire second depth information of the hand 310 sensed at the 2a-th point 12 by using the determined size difference and the first depth information. For example, when the first depth information of the hand 310 sensed at the first point 32 is d1 and the determined size difference corresponds to two times, the device 100 may determine that the second depth information of the 2a-th point 12 is 2d1 that is $d1*(64 \text{ pixels}/32 \text{ pixels})$.

According to another example, when the size of the palm part of the hand 310 sensed at the first point 32 corresponds to 64 pixels and the size of a palm part of the hand 310 sensed at a 2b-th point 22 in the second sensing region 20 out of the common sensing region 30 corresponds to 128 pixels, the device 100 may determine that the size of the hand 310 sensed at the first point 32 is two times smaller than the size of the hand 310 sensed at the 2b-th point 22. The device 100 may also acquire the second depth information of the hand 310 sensed at the 2b-th point 22 by using the determined size difference and the first depth information. For example, when the first depth information of the hand 310 sensed at the first point 32 is d1 and the determined size difference corresponds to 0.5 times, the device 100 may determine that the second depth information of the 2b-th point 22 is 0.5d1 that is $d1*(32 \text{ pixels}/64 \text{ pixels})$.

Figure 4:
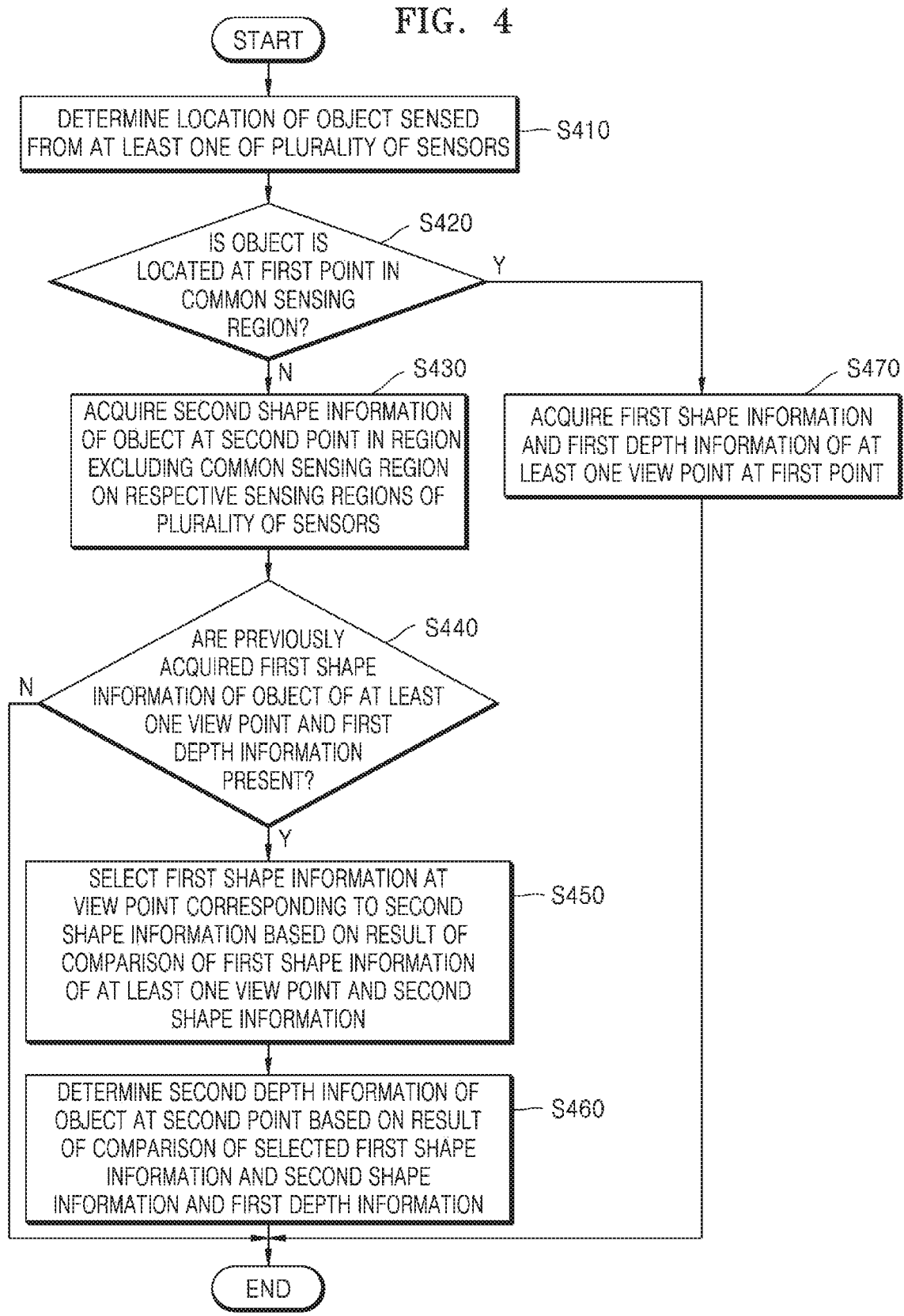
FIG. 4 is a flowchart illustrating a method performed by a device of acquiring depth information of an object according to a location of the object according to an embodiment.

FIG. 4 is a flowchart illustrating a method performed by a device of acquiring depth information of an object according to a location of the object according to an embodiment.

In operation S410, the device may determine the location of the object sensed from at least one of a plurality of sensors.

The device according to an embodiment may acquire location information of the object when the object is located in respective sensing regions of the plurality of sensors.

In operation S420, the device may determine whether the object is located at a first point in a common sensing region.

The device according to an embodiment may determine whether the object is located in the common sensing region, which is a sensing region common to the plurality of sensors, based on the determined location of the object.

In operation S430, the device may acquire second shape information of the object at a second point in a region excluding the common sensing region on the respective sensing regions of the plurality of sensors.

The device according to an embodiment may acquire the second shape information of the object at the second point when the object is located at the second point in the region excluding the common sensing region on the respective sensing regions of the plurality of sensors.

In operation S440, the device may determine whether previously acquired first shape information of the object of at least one view point and first depth information are present. Here, the first shape information and the first depth information represent acquired shape information and depth information when the object is located in the common sensing region.

In operation S450, the device may select first shape information at a view point corresponding to the second shape information based on a result of comparison of the first shape information of the at least one view point and the second shape information.

The device according to an embodiment may select the first shape information at the view point corresponding to the second shape information from the first shape information of the at least one view point when the previously acquired first shape information of the object of the at least one view point and the first depth information are present. For example, when first shape information of the object in a front direction and first shape information of the object in a side direction are previously acquired, and the second shape information corresponds to a shape of the object in the side direction, the device may select the first shape information of the object in the side direction.

In operation S460, the device may determine the second depth information of the object at the second point based on a result of comparison of the selected first shape information and the second shape information and the first depth information.

The device according to an embodiment may compare the selected first shape information to the second shape information to determine a size difference between the shape of the object sensed at the first point and the shape of the object sensed at the second point. The device may also determine the second depth information of the object at the second point based on the determined size difference and the first depth information.

In operation S470, the device may acquire the first shape information and the first depth information of the object of the at least one view point at the first point.

On the other hand, operation S470 may correspond to operation S210 described above with reference to FIG. 2.

Figure 5:
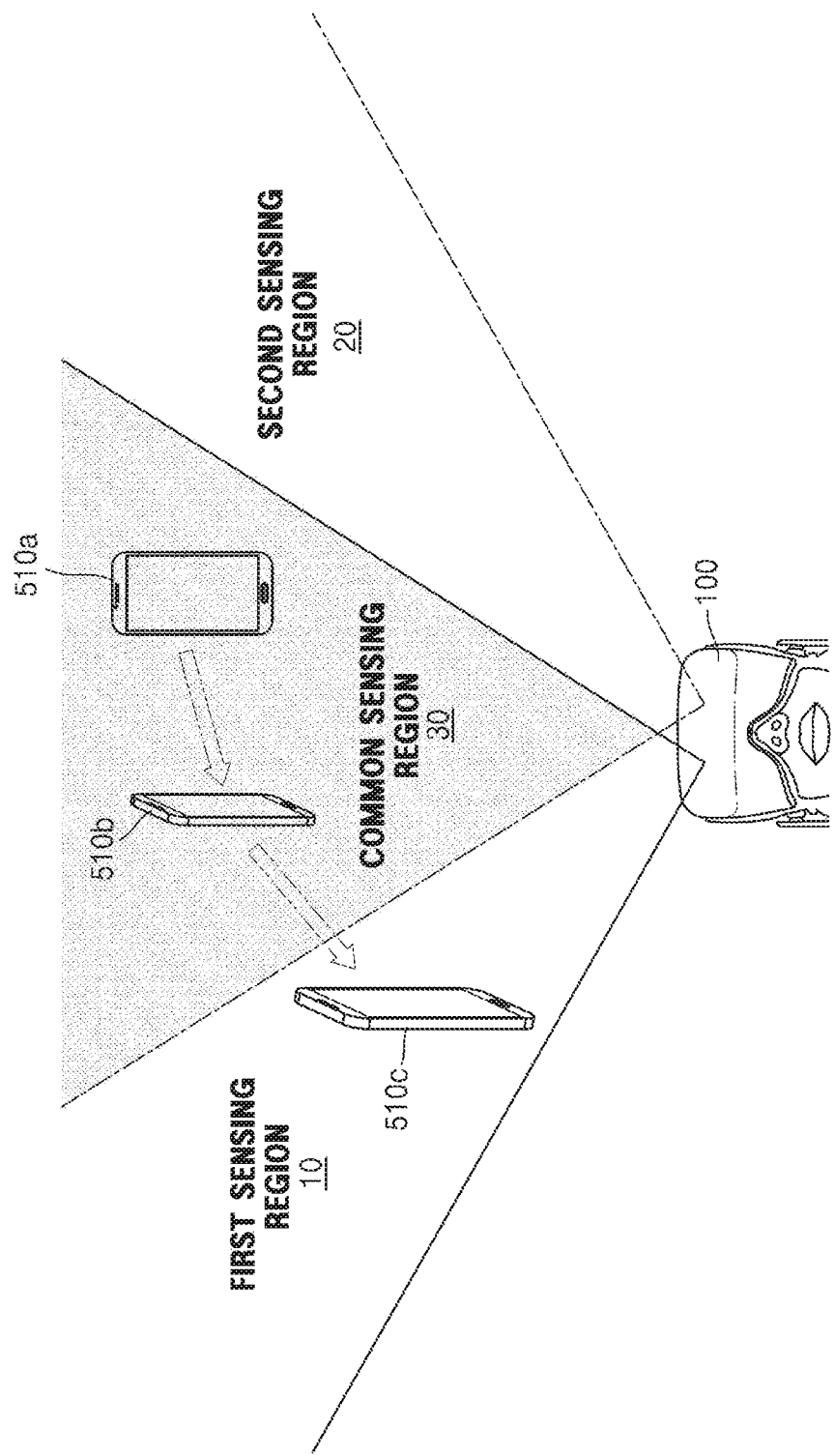
FIG. 5 is a diagram for describing a method performed by the device 100 of acquiring depth information of objects by identifying shape information of the objects at different view points according to an embodiment.

FIG. 5 is a diagram for describing a method performed by the device 100 of acquiring depth information of objects by identifying shape information of the objects at different view points according to an embodiment.

The device 100 according to an embodiment may acquire first shape information and first depth information of at least one viewpoint of objects 510a and 510b located in the common sensing region 30. For example, the device 100 may acquire the first shape information and the first depth information of the object 510a located at a 1a-th point in the common sensing region 30 in a front direction. In addition, the device 100 may acquire the first shape information and the first depth information of the object 510b located at a 1b-th point in the common sensing region 30 in a side direction according to a state change or a movement change of the object 510b.

The device 100 according to an embodiment may acquire second shape information of an object 510c located at a second point in a region excluding the common sensing region 30 on respective sensing regions of a plurality of sensors.

The device 100 may select first shape information of a view point corresponding to the second shape information from the previously acquired first shape information of the object 510a located at the 1a-th point in the front direction and the previously acquired first shape information of the object 510b located at the 1b-th point in the side direction. For example, when the second shape information corresponds to the first shape information of the object 510b located at the 1b-th point in the side direction in a shape, the device 100 may select the first shape information in the side direction.

The device 100 may compare the selected first shape information to the second shape information to determine a size difference between the object 510b sensed at the 1b-th point and the object 510c sensed at the second point. The device 100 may also determine the second depth information of the object 510c at the second point based on the determined size difference and the first depth information.

Figure 6:
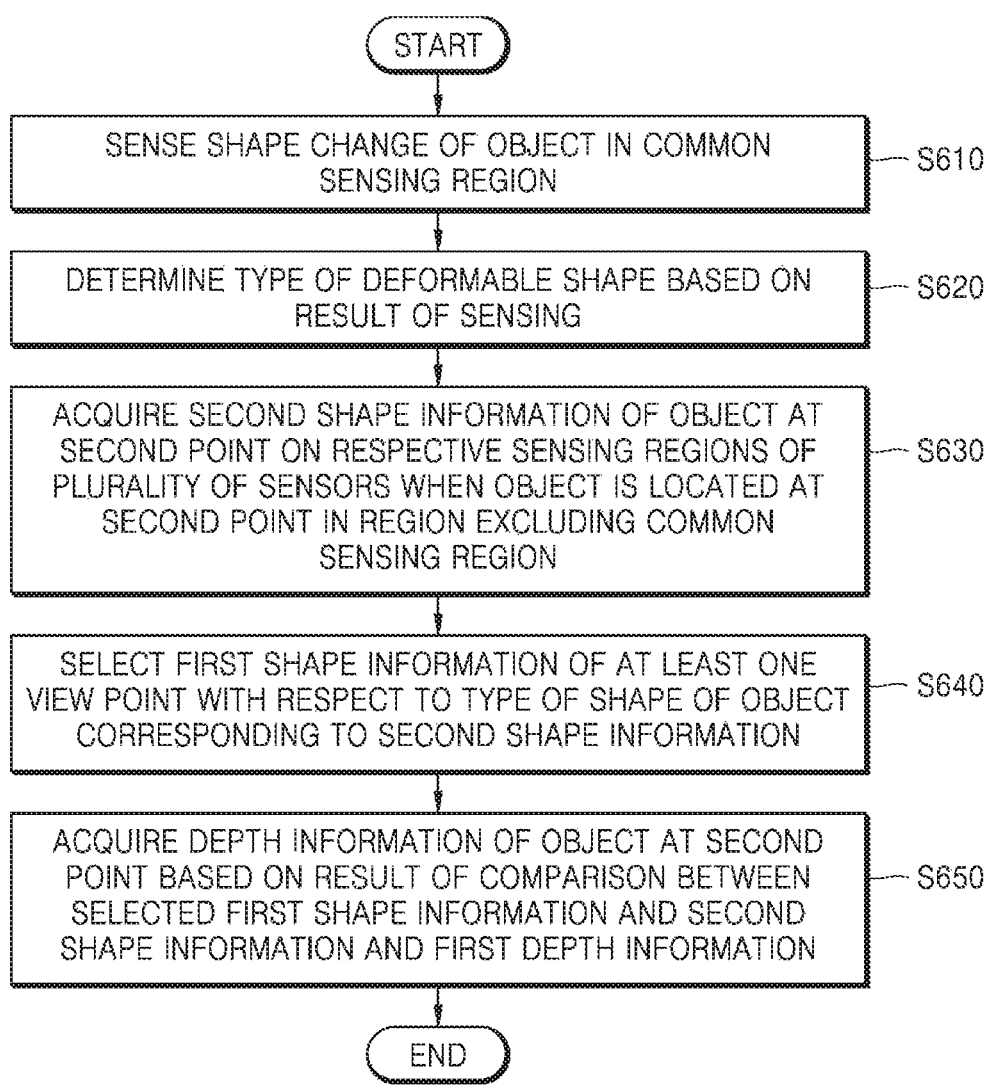
FIG. 6 is a flowchart illustrating a method performed by a device of acquiring depth information of an acquired object by identifying a type of a shape of the object according to an embodiment.

FIG. 6 is a flowchart illustrating a method performed by a device of acquiring depth information of an acquired object by identifying a type of a shape of the object according to an embodiment.

In operation S610, the device may sense a shape change of the object in a common sensing region.

An object that may be sensed by the device according to an embodiment may include a deformable object. Here, the deformable object is an object whose shape changes, and may include, for example, a human body, a folding chair, and the like. The deformable object may be deformed by an external force or the like. On the other hand, this is only an embodiment, and the device may sense an object that is not deformed. For example, smart phones, smart cars, and the like may be included in the object that is not deformed.

The device according to an embodiment may identify a type of the object when the object is sensed in the common sensing region. As a result of identifying the type of the object, the device may sense the object in real time and determine whether the shape of the object changes when the object is deformable. On the other hand, according to another embodiment, the device may determine whether the shape of the object changes without identifying the type of the object by tracing the object sensed in the common sensing region in real time.

In operation S620, the device may determine the type of the deformable shape based on a result of sensing.

The device according to an embodiment may classify shape information of each of a plurality of shapes of the object acquired as the result of sensing to determine the type of the deformable shape of the object. For example, in the case where the sensed object is a hand, the device may classify the shape information of the hand, such as when fingers are unfolded, when some of the fingers are bent, when a fist is held, and the like to determine a type of a shape of the hand. This will be described later in more detail with reference to FIG. 7.

In operation S630, the device may acquire second shape information of the object at a second point on respective sensing regions of the plurality of sensors when the object is located at the second point in a region excluding the common sensing region.

On the other hand, operation S630 may correspond to operation S220 described above with reference to FIG. 2.

In operation S640, the device may select first shape information of at least one view point with respect to a type of the shape of the object corresponding to the second shape information.

For example, when the second shape information indicates a shape of the hand with the fingers unfolded, the device may select first shape information of the hand of a type corresponding to a state where the fingers are unfolded at the at least one view point from the first shape information of the hand of the at least one view point with respect to a plurality of types. Further, when the second shape information indicates a side shape of the hand with the fingers unfolded, the device may select first shape information of the hand in a side surface from the first shape information of the hand of the type corresponding to the state where the fingers are unfolded at the at least one view point.

In operation S650, the device may acquire the depth information of the object at the second point based on a result of comparison between the selected first shape information and the second shape information and the first depth information.

Meanwhile, operation S650 may correspond to operation S220 described above with reference to FIG. 2.

Figure 7:
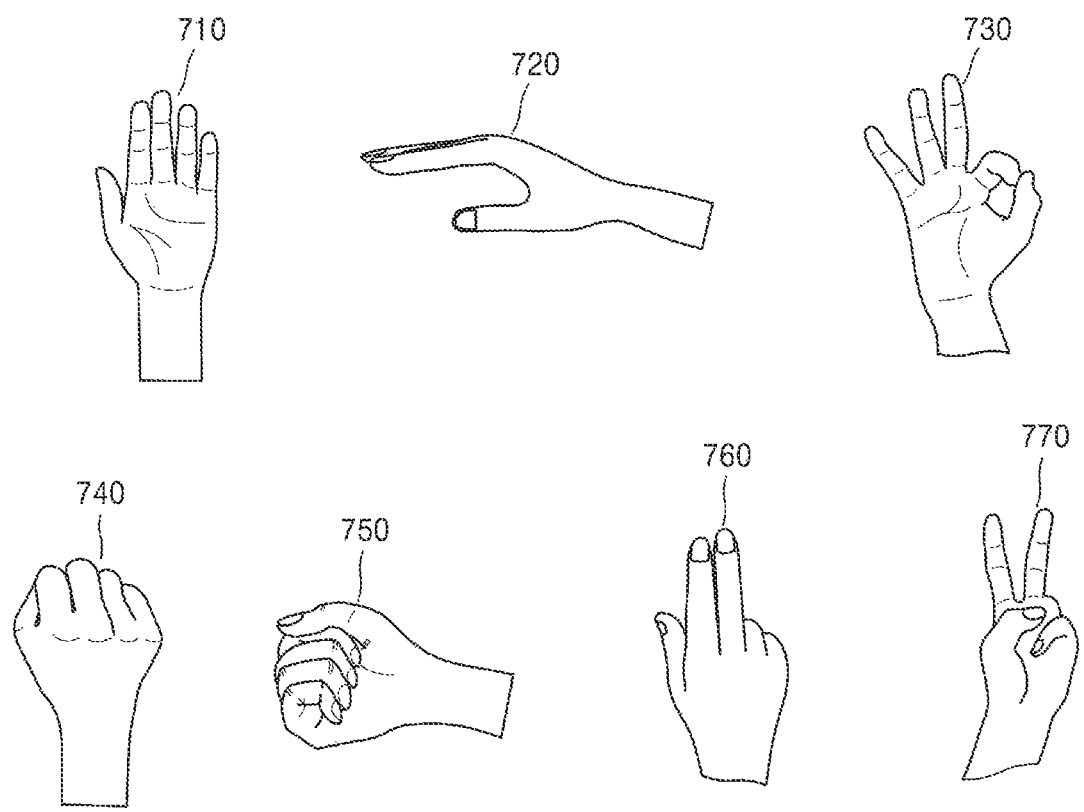
FIG. 7 is a diagram for describing a method performed by a device of identifying a type of a shape of an object according to an embodiment.

FIG. 7 is a diagram for describing a method performed by a device of identifying a type of a shape of an object according to an embodiment.

The device according to an embodiment may acquire at least one piece of first shape information of the object sensed in a common sensing region of a plurality of sensors. For example, the device may acquire the at least one piece of first shape information of a hand sensed in the common sensing region of the plurality of sensors.

The hand is a deformable object, and the device may classify the at least on piece of first shape information of the hand, such as when fingers are unfolded, when some of the fingers are bent, when a fist is held, and the like.

For example, referring to FIG. 7, the device may designate A type, B type and C type respectively when the fingers are unfolded, when some of the fingers are bent, and when the fist is held. The device may classify 1a-th shape information 710 and 1b-th shape information 720 into the A type. In addition, the device may classify 1c-th shape information 730, 1f-th shape information 760, and 1g-th shape information 770 into the B-type. In addition, the device 100 may classify 1d-th shape information 740 and 1e-th shape information 750 into the C type.

On the other hand, the first shape information of each classified type may include different first shape information according to a view point. For example, the 1d-th shape information 740 included in the B type may indicate a front shape of the hand holding the fist, and the 1e-th shape information 750 may indicate a side shape of the hand holding the fist.

The device according to an embodiment may classify the first shape information of the deformable object according to the type of the shape, thereby more accurately acquiring depth information of the object when the object is located in a region excluding the common sensing region of sensing regions of the plurality of sensors.

Figure 8:
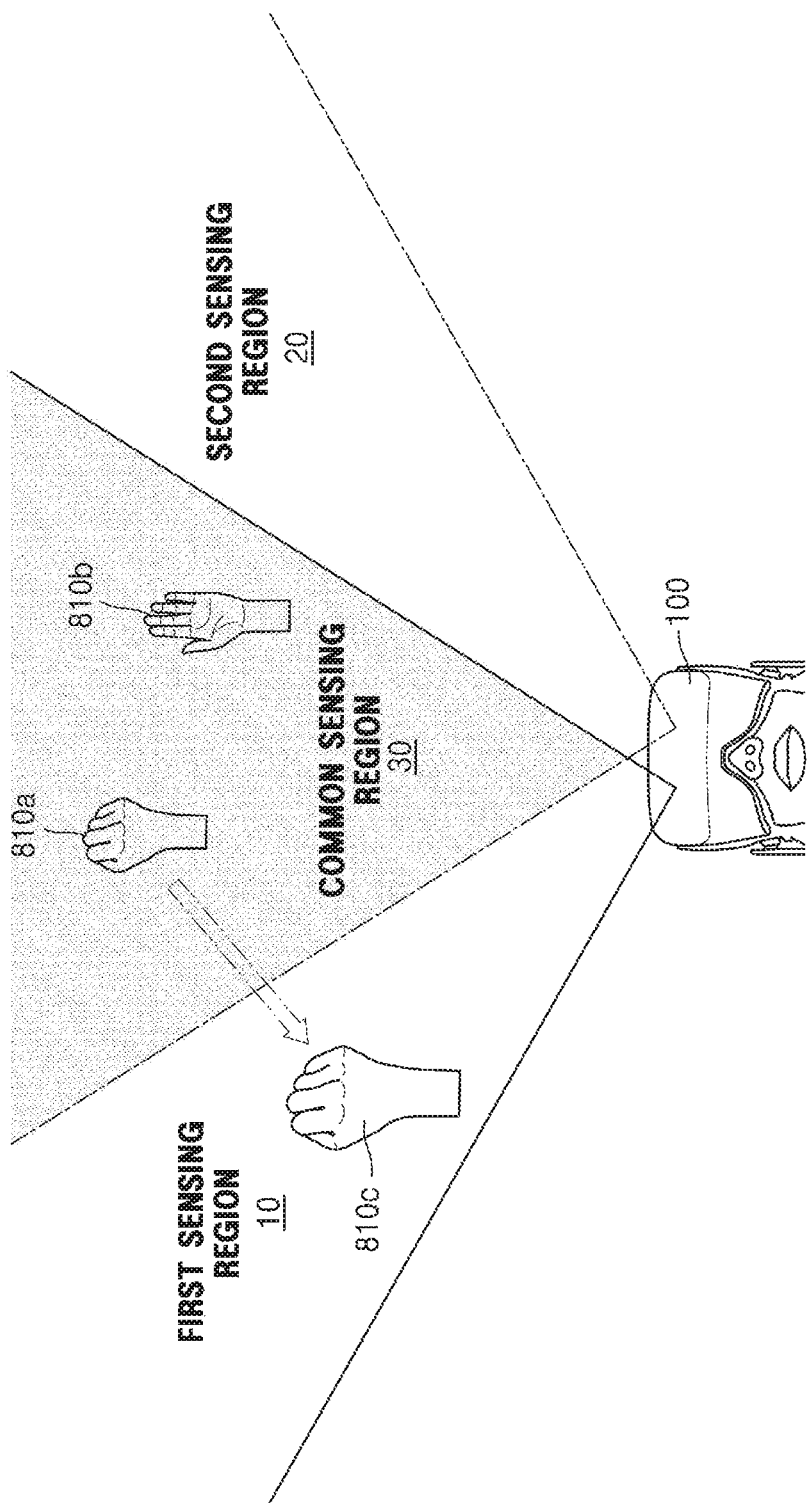
FIG. 8 is a diagram for describing a method performed by a device of acquiring depth information of an acquired object by identifying a type of a shape of the object according to an embodiment.

FIG. 8 is a diagram for describing a method performed by the device 100 of acquiring depth information of an acquired object by identifying a type of a shape of the object according to an embodiment.

The device 100 according to an embodiment may acquire at least one piece of first shape information of the object located in the common sensing region 30.

For example, the device 100 may acquire the first shape information and first depth information of a hand 810a holding a fist located at a 1a-th point in the common sensing region 30 in a front direction. In addition, the device 100 may acquire the first shape information and the first depth information of a hand 810b with fingers unfolded located at a 1b-th point in the common sensing region 30 according to a state change of a movement change of the hand 810b in the front direction.

The device 100 according to an embodiment may acquire second shape information of a hand 810c located at a second point in a region excluding the common sensing region 30 on the respective sensing regions of the plurality of sensors.

The device 100 may select first shape information of a view point corresponding to the second shape information from the previously acquired first shape information of the hand 810a holding the fist located at the 1a-th point in the front direction and the previously acquired first shape information of the hand 810b with fingers unfolded located at the 1b-th point in the front direction. For example, when the second shape information corresponds to the first shape information of the hand 810a holding the fist located at the 1a-th point in the front direction in a shape, etc., the device 100 may select the first shape information of the hand 810a holding the fist located at the 1a-th point in the front direction.

The device 100 may compare the selected first shape information to the second shape information to determine a size difference between the hand 810a sensed at the 1a-th point and the hand 810c sensed at the second point. The device 100 may also determine second depth information of the hand 810c at the second point based on the determined size difference and the first depth information.

FIG. 9 is a diagram for describing a method performed by the device 100 of changing a sensing region of at least one of a plurality of sensors according to a movement of an object according to an embodiment.

The device 100 according to an embodiment may determine a location of the object based on location information of the object acquired from the plurality of sensors.

Meanwhile, the device 100 may acquire first shape information of at least one view point of an object 910a located at a first point in a common sensing region 30a and first depth information. In addition, the device 100 may acquire second shape information of an object 910b located at a 2a-th point in a 1a-th sensing region 10a set to a first sensor.

The device 100 according to an embodiment may acquire the second shape information of the object 910b located at the 2a-th point in the 1a-th sensing region 10a based on a result of comparison of the first shape information and the second shape information of the at least one view point and the first depth information.

Meanwhile, the device 100 may sense a moving direction and a speed of the object, etc. to determine whether the object is out of respective sensing regions of the plurality of sensors. For example, the device 100 may determine whether the object 910b located at the 2a-th point is out of the 1a-th sensing region 10a. The device 100 may change a sensing region of the first sensor based on a moving direction and a speed of the object 910b before the object 910b located at the 2a-th point is out of the 1a-th sensing region 10a. For example, the device 100 may change the 1a-th sensing region 10a to a 1b-th sensing region 10b by changing an angle of the first sensor or the like.

Accordingly, even when the object 910b moves outside the predetermined respective sensing regions of the plurality of sensors, the device 100 may change the sensing region of the at least one of the plurality of sensors to continuously acquire shape information of the object. In addition, the device 100 may acquire depth information of the moved object based on shape information of the moved object, and the first shape information and the first depth information of the object 910a sensed at the first point in the common sensing region 30a.

Figure 10:
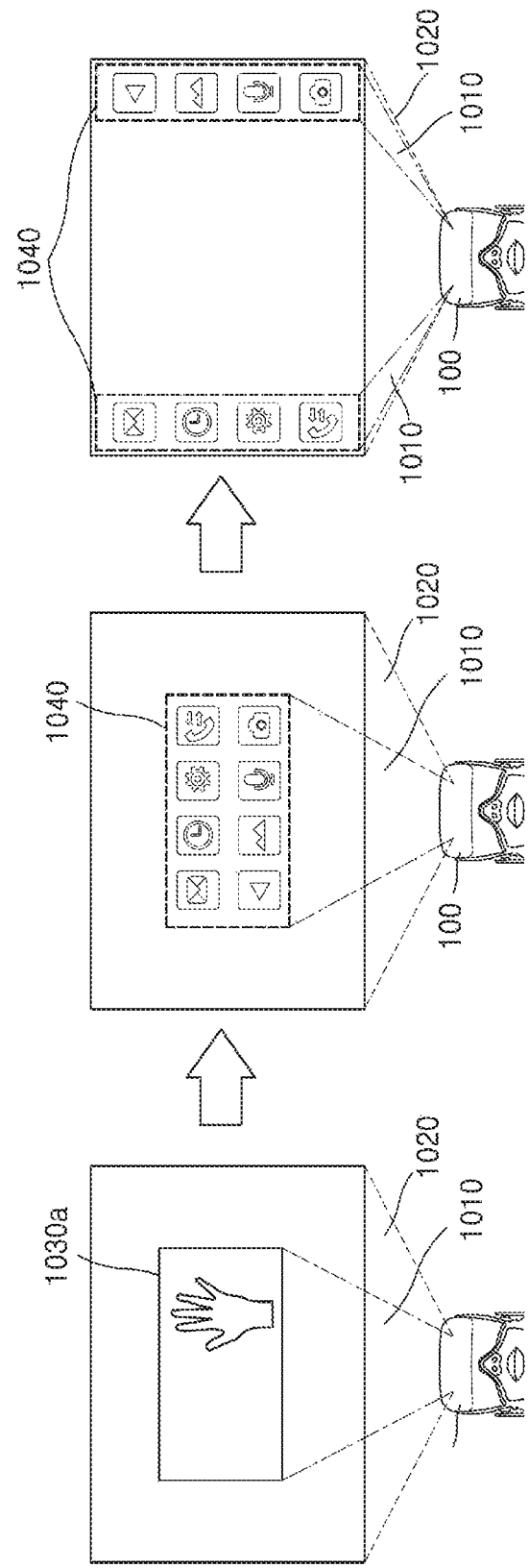
FIG. 10 is a diagram for describing a method performed by a device of expanding a user interface as depth information of an object is acquired according to an embodiment.

FIG. 10 is a diagram for describing a method performed by the device 100 of expanding a user interface as depth information of an object 1030a is acquired according to an embodiment.

The device 100 according to an embodiment may acquire the depth information of the object 1030a located in a region (1020, hereinafter referred to as an external region of a common sensing region 1010) excluding the common sensing region 1010 on respective sensing regions of a plurality of sensors based on first shape information of at least one view point of the object 1030a sensed at a first point in the common sensing region 1010 and first depth information.

The device 100 according to an embodiment may expand the user interface capable of sensing a user input set in the common sensing region 1010 to the external region 1020 of the common sensing region 1010 as the depth information of the object 1030b located in the external region 1020 of the common sensing region 1010 is acquired. Here, the user interface capable of sensing the user input represents, for example, an interface capable of sensing the user input for selecting a specific icon by using a distance change between a user's finger and the device 100. Here, the user's finger is an example of a user input means, but other input means such as a touch pen, etc. may be used.

Referring to FIG. 10, the device 100 may expand the user interface to the external region 1020 of the common sensing region 1010 to display icons 1040 displayed on a region corresponding to the common sensing region 1010 on the external region 1020 of the common sensing region 1010. The icons 1040 displayed on the user interface may perform a function of executing at least one application installed in the device 100, but this is merely an example, and the function of the icons 1040 is not limited thereto.

Figure 11:
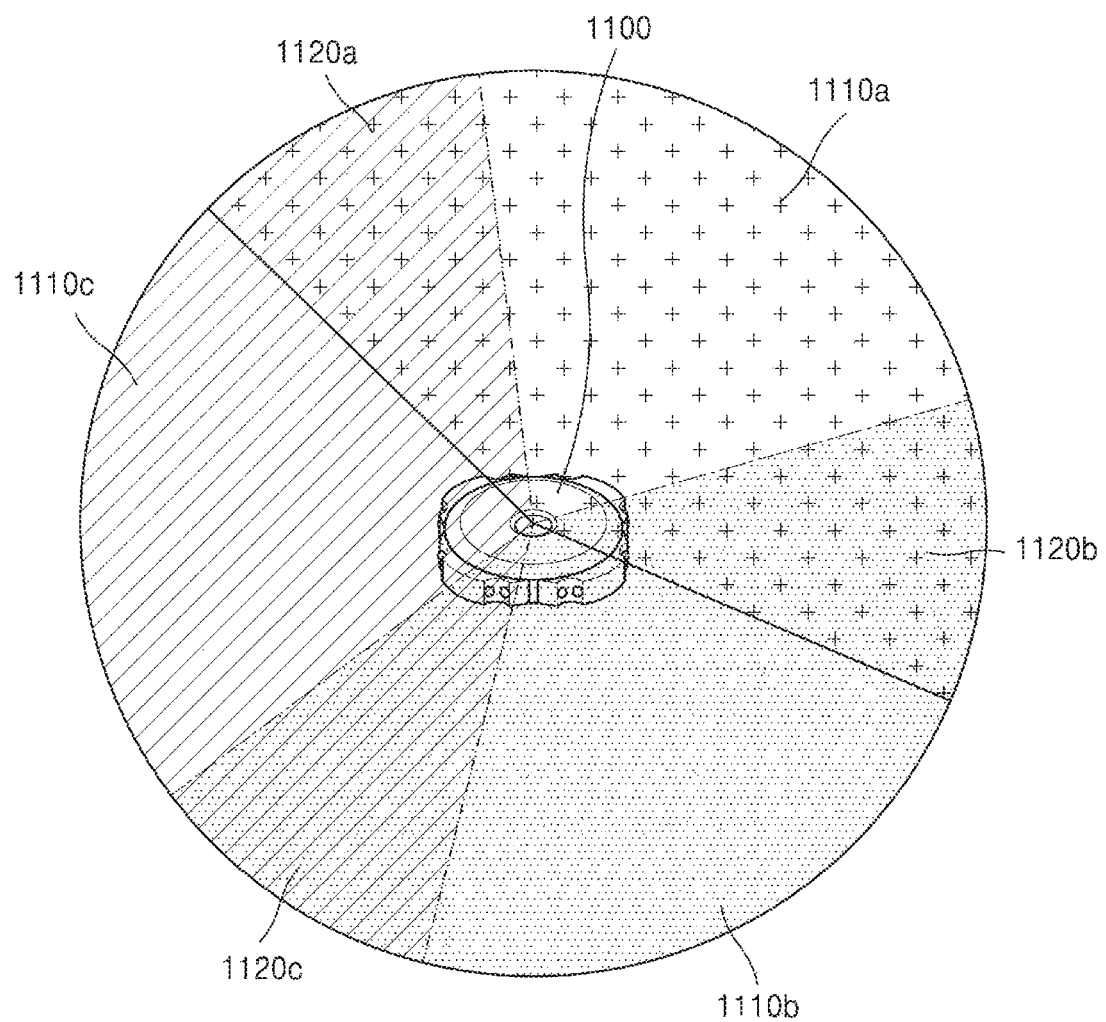
FIG. 11 is a diagram for describing a method performed by a device of acquiring depth information of an object according to another embodiment.

FIG. 11 is a diagram for describing a method performed by a device 1100 of acquiring depth information of an object according to another embodiment.

The device 1100 according to an embodiment may include a plurality of sensors capable of acquiring a 360 degree image. For example, the device 1100 may include the plurality of sensors including a first sensor, a second sensor, and a third sensor. In addition, a first sensing region 1110*a*, a second sensing region 1110*b*, and a third sensing region 1110*c* may be respectively set in the first sensor, the second sensor, and the third sensor. Here, a region in which the first sensing region 1110*a*, the second sensing region 1110*b*, and the third sensing region 1110*c* are added may correspond to a 360 degree region with respect to the device 1100.

The device 1100 may acquire first shape information of at least one view point of the object when the object is located on common sensing regions 1120*a*, 1120*b*, and 1120*c* where sensing regions of the plurality of sensors are common. In addition, the device 1100 may acquire first depth information of the object by using a stereo method.

On the other hand, the device 1100 may determine whether the object is out of the common sensing regions 1120*a*, 1120*b*, and 1120*c* by tracing a location of the object. The device 1100 may acquire second shape information of the object when the object is out of the common sensing regions 1120*a*, 1120*b*, and 1120*c* as a result of determination. For example, when the object is located at a second point in a region excluding the common sensing regions 1120*a* and 1120*b* on the first sensing region 1110*a* of the first sensor among the plurality of sensors, the device 1100 may acquire the second shape information of the object at the second point.

The device 1100 may acquire the second depth information of the object at the second point based on a result of comparison between the first shape information of at least one view point and the second shape information and the first depth information. Here, a method performed by the device 1100 of acquiring the second depth information may correspond to the method of acquiring the depth information described above with reference to FIGS. 1 to 10.

Figure 12:
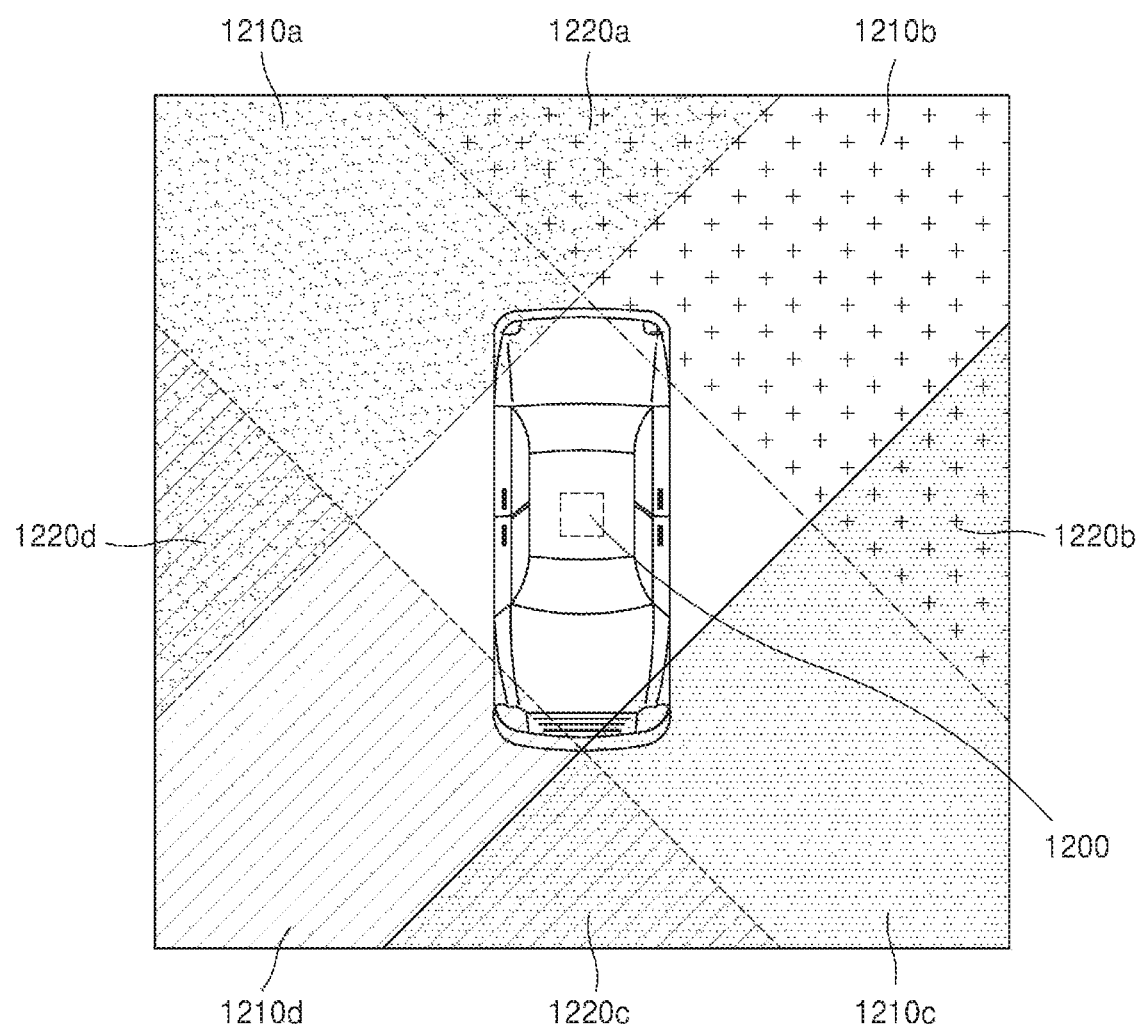
FIG. 12 is a diagram for describing a method performed by a device of acquiring depth information of an object according to another embodiment.

FIG. 12 is a diagram for describing a method performed by a device 1200 of acquiring depth information of an object according to another embodiment.

The device 1200 according to an embodiment may be a sensing device provided in a smart car. However, this is only an example, and the device 1200 is not limited to the sensing device provided in the smart car.

The device 1200 according to an embodiment may include a plurality of sensors capable of acquiring images of a wide field of view. For example, the device 1200 may include the plurality of sensors including a first sensor, a second sensor, a third sensor, and a fourth sensor. A first sensing region 1210*a*, a second sensing region 1210*b*, a third sensing region 1210*c*, and a fourth sensing region 1210*d* may be respectively set to the first sensor, the second sensor, the third sensor, and the fourth sensor.

The device 1200 may acquire first shape information of at least one view point of the object when the object is located on common sensing regions 1220*a*, 1220*b*, 1220*c*, and 1220*d* where sensing regions of the plurality of sensors are common. In addition, the device 1200 may acquire first depth information of the object by using a stereo method.

On the other hand, the device 1200 may determine whether the object is out of the common sensing regions 1220*a*, 1220*b*, 1220*c*, and 1220*d* by tracing a location of the object. The device 1200 may acquire second shape information of the object when the object is out of the common sensing regions 1220*a*, 1220*b*, 1220*c*, and 1220*d* as a result of determination. For example, when the object is located at a second point in a region excluding the common sensing regions 1220*a* and 1220*d* on the first sensing region 1210*a* of the first sensor among the plurality of sensors, the device 1200 may acquire the second shape information of the object at the second point.

The device 1200 may acquire the second depth information of the object at the second point based on a result of comparison between the first shape information of the at least one view point and the second shape information and the first depth information. Here, a method performed by the device 1200 of acquiring the second depth information may correspond to a method of acquiring the depth information described above with reference to FIGS. 1 to 10.

Figure 13:
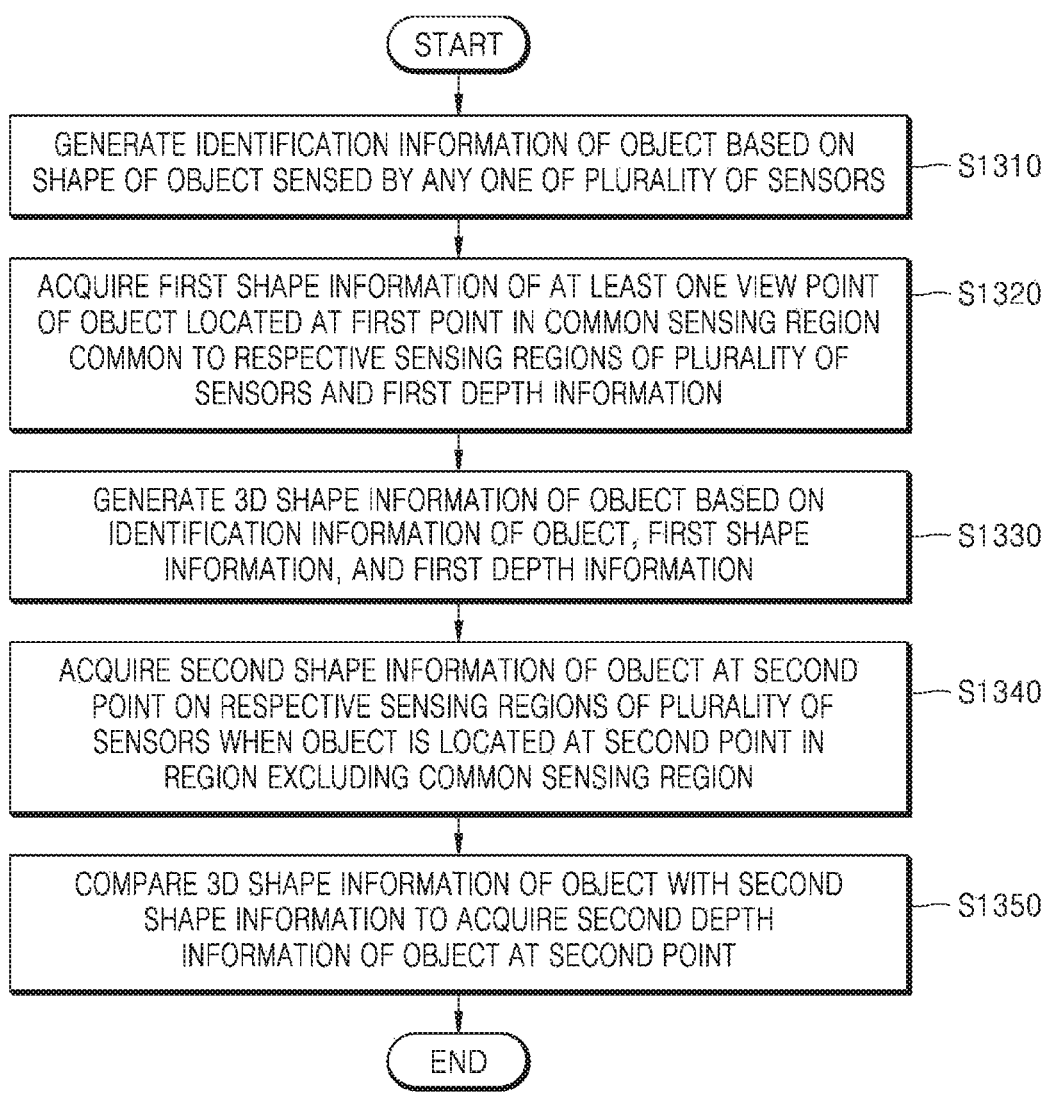
FIG. 13 is a flowchart illustrating a method performed by a device of acquiring depth information by using identification information of an object according to an embodiment.

FIG. 13 is a flowchart illustrating a method performed by a device of acquiring depth information by using identification information of an object according to an embodiment.

In operation S1310, the device may generate the identification information of the object based on a shape of the object sensed by any one of a plurality of sensors. Here, the identification information of the object may include at least one of a volume of the object and a type of the object. However, this is an embodiment only, and the identification information of the object is not limited to the above-described example. The identification information of the object may further include other information about characteristics of the object that may be generated based on two-dimensional (2D) information of the object.

The device may identify the shape which is the 2D information of the object, when the object is sensed by any one of the plurality of sensors. The device may also generate the identification information including at least one of the volume of the object and the type of the object based on the identified shape of the object. Here, the type of the object indicates a category to which the object belongs. A range of a category that may be identified by the device may vary depending on the configuration. For example, the device may identify the type of the object as a category such as a person, an object, an animal, etc., or may identify the type of the object as a category such as a smart phone, a finger, a dog, etc. that is more subdivided than the above-described example.

In operation S1320, the device may acquire first shape information of at least one view point of the object located at a first point in a common sensing region common to respective sensing regions of the plurality of sensors and first depth information.

As the object moves to the common sensing region, the device according to an embodiment may acquire the first depth information corresponding to three-dimensional (3D) information of the object together with the first shape information of the object.

Meanwhile, operation S1320 may correspond to operation S210 described above with reference to FIG. 2.

In operation S1330, the device may generate 3D shape information of the object based on the identification information of the object, the first shape information, and the first depth information. Here, the 3D shape information may include shape information according to a depth of the object.

For example, the device may identify the object as a beverage can based on the identity of the object. Further, the device may combine previously stored information about the beverage can with the first shape information and the first depth information acquired in the common sensing region to generate the 3D shape information of the object. For example, the device may combine previously stored information about a volume and a shape of the beverage can with the first depth information (e.g., 20 cm distance) of the beverage can and the first shape information (size of 32 pixels) to generate the 3D shape information of the beverage can.

The device according to an embodiment may combine the first shape information and the first depth information acquired in the common sensing region with the identification information of the object, thereby reducing time required for generation of the 3D shape information of the object and improving the accuracy as compared with a case of generating 3D shape information of the object by using the first shape information and the first depth information.

In operation S1340, the device may acquire second shape information of the object at a second point on the respective sensing regions of the plurality of sensors when the object is located at the second point in a region excluding the common sensing region.

In operation S1350, the device may compare the 3D shape information of the object with the second shape information to acquire second depth information of the object at the second point.

For example, the device may compare shape information according to a depth included in the 3D shape information of the object with the second shape information (for example, size of 64 pixels) to acquire shape information corresponding to the second depth information (for example, size of 64 pixels).

Figure 14:
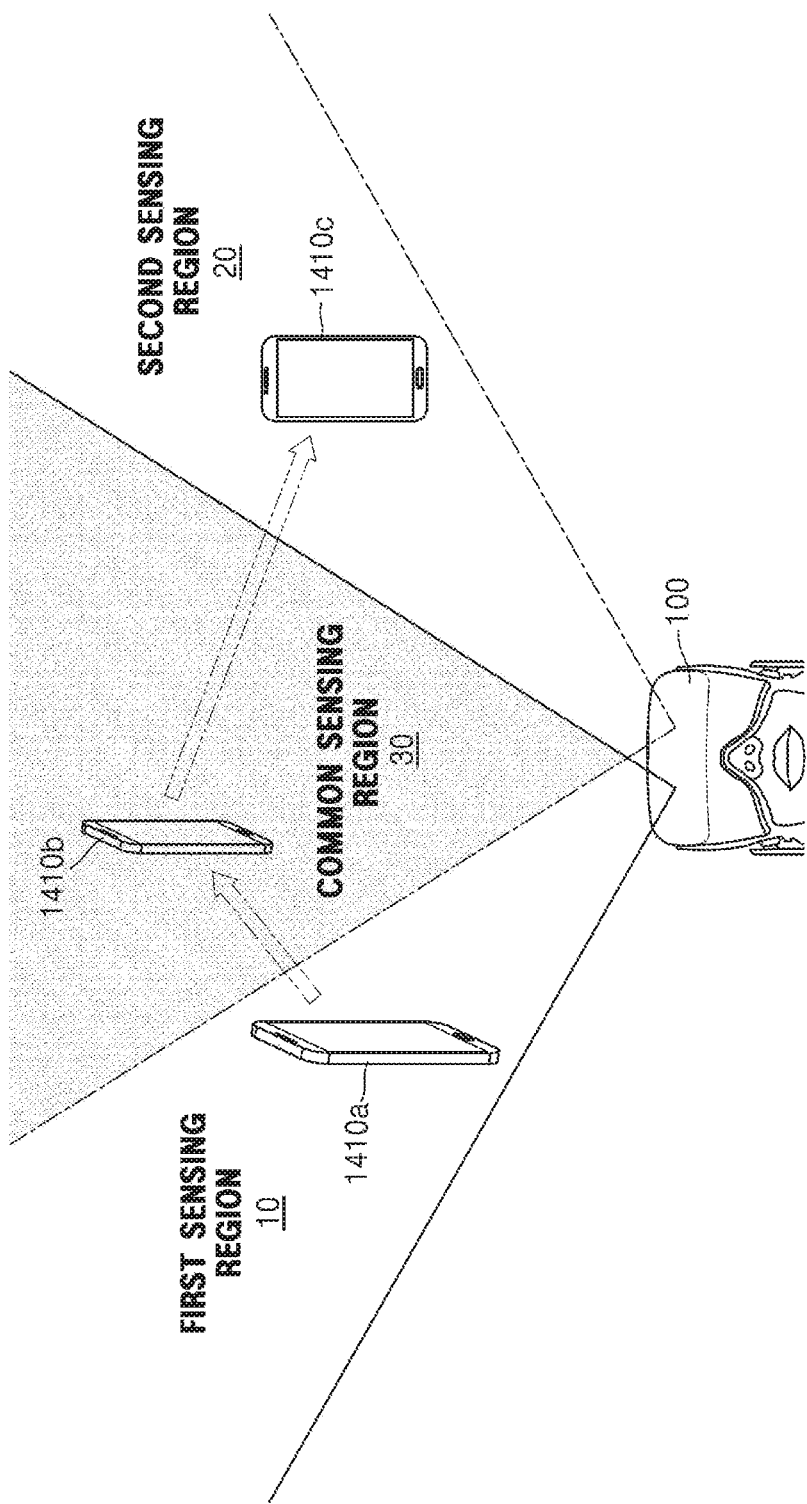
FIG. 14 is a diagram for describing a method performed by a device of acquiring depth information by using identification information of an object according to an embodiment.

FIG. 14 is a diagram for describing a method performed by the device 100 of acquiring depth information by using identification information of an object according to an embodiment.

Referring to FIG. 14, the device 100 may sense the object located at a point excluding the common sensing region 30 in the first sensing region 10 of a first sensor among a plurality of sensors. In the present embodiment, it is assumed that the object is a smart phone. It is also assumed that a location of the object may change as the object moves.

The device 100 may identify that a type of an object 1410a corresponds to the smart phone based on a shape of the object 1410a sensed in a region excluding the common sensing region 30 in the first sensing region 10. The device 100 may acquire first shape information and first depth information of a smart phone 1410b in the common sensing region 30 when the object 1410a moves and is located in the common sensing region 30.

The device 100 may generate 3D shape information of the object based on the identification information indicating that the object corresponds to the smart phone, the first shape information, and the first depth information. For example, the device 100 may combine previously stored information about a volume and a shape of the smart phone with the first shape information and the first depth information to generate 3D shape information of the smart phone.

Meanwhile, the device 100 may acquire second shape information of an object 1410c located at a second point in a region excluding the common sensing region 30 in the second sensing region 20. The device 100 may compare shape information according to the depth included in the 3D shape information of the object with the second shape information to acquire depth information corresponding to the second shape information.

Figure 15:
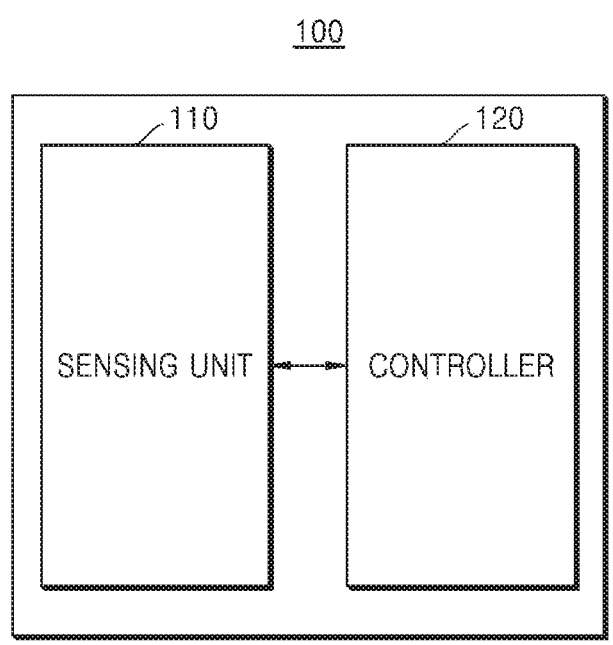

FIGS. 15 and 16 are block diagrams of the device 100 for acquiring depth information according to an embodiment.

As shown in FIG. 15, the device 100 according to an embodiment may include a sensing unit 110 and a controller 120. However, all illustrated components are not indispensable components. The device 100 may be implemented by more components than the illustrated components, and the device 100 may be implemented by fewer components than the illustrated components.

For example, as shown in FIG. 16, the device 100 according to an embodiment may include an output unit 130, a user input unit 140, a communicator 150, an A/V input unit 160, and a memory 170, in addition to the sensing unit 110 and the controller 120.

Hereinafter, the components will be described in order.

The sensing unit 110 may sense at least one of a state of the device 100, a state around the device 100, and a state of a user wearing the device 100, and transmit sensed information to the controller 120. For example, the sensing unit 110 may acquire first shape information of at least one view point of an object located in respective sensing regions of a plurality of sensors (for example, 119) included in the sensing unit 110 and second shape information.

The sensing unit 110 according to an embodiment may sense the object located at a first point in a common sensing region common to respective sensing regions of the plurality of sensors. In addition, the sensing unit 110 may acquire the first shape information of the at least one view point of the object located at the first point. The sensing unit 110 may acquire second shape information of the object at a second point on the respective sensing regions of the plurality of sensors when the object is located at the second point in a region excluding the common sensing region.

The sensing unit 110 according to an embodiment may acquire location information of the object. Also, the sensing unit 110 may sense a shape change of the object in the common sensing region.

The sensing unit 110 may include at least one of a magnetism sensor 111, an acceleration sensor 112, a temperature/humidity sensor 113, an infrared sensor 114, a gyroscope sensor 115, a location sensor (e.g. GPS) 116, an atmospheric pressure sensor 117, a proximity sensor 118, and an RGB sensor (illuminance sensor) 119, but is not limited thereto. Functions of respective sensors may be intuitively inferred and thus, detailed descriptions thereof will be omitted.

The controller 120 may usually control an overall operation of the device 100. For example, the controller 120 may generally control the sensing unit 110, the output unit 130, the user input unit 140, the communicator 150, the A/V input unit 160, and the memory 170, etc. by executing programs stored in the memory 170.

The controller 120 may acquire first depth information of the object at the first point. In addition, the controller 120 may acquire depth information of the object at a second point based on a result of comparison between the first shape information of the at least one view point and the second shape information and the first depth information.

The controller 120 according to an embodiment may select first shape information of a view point corresponding to the second shape information from among the first shape information of the at least one view point. In addition, the controller 120 may determine a size difference of the object sensed at the first point and the second point based on the selected first shape information and the second shape information. The controller 120 may determine the second depth information based on the determined size difference and the first depth information.

The controller 120 according to an embodiment may generate a 3D model of the object. Further, the controller 120 may determine whether the object is located at the second point in a region excluding the common sensing region on the respective sensing regions of the plurality of sensors based on the acquired location information of the object.

The controller 120 according to an embodiment may acquire the first shape information of the at least one view point according to a type of a deformable shape when a shape of the object is deformable. In addition, the controller 120 may determine the type of the deformable shape based on a shape change of the object sensed by the sensing unit 110.

The controller 120 according to an embodiment may change a sensing region of at least one of the plurality of sensors based on a moving direction of the object when the object is located within a predetermined distance range from the respective sensing regions of the plurality of sensors.

The controller 120 according to an embodiment may identify a type of the object based on the first shape information of the at least one view point.

The controller 120 according to an embodiment may expand a user interface capable of sensing an input of a user of the device 100 set in a region corresponding to the common sensing region to the respective sensing regions of the plurality of sensors when the first shape information of the at least one view point and the first depth information are acquired.

The output unit 130 may output an audio signal, a video signal or a vibration signal and may include a display 131, an audio output unit 132, and a vibration motor 133.

The display 131 may display information processed in the device 100.

Meanwhile, when the display 131 and a touch pad make a touch screen in a layer structure, the display 131 may be used as an input device in addition to as an output device. The display 131 may include at least one of a liquid crystal display, a thin film transistor-liquid crystal display, an organic light-emitting diode display, a flexible display, a three-dimensional display, and an electrophoretic display. Also, the device 100 may include two or more displays 131 depending on an implementation type of the device 100. In this regard, two or more displays 131 may face each other via a hinge.

The audio output unit 132 may output audio data received from the communicator 150 or stored in the memory 170. Also, the audio output unit 132 may output an audio signal related to functions processed in the device 100 (for example, a call signal receiving sound, a message receiving sound, and a notification sound.) Such an audio output unit 132 may include a speaker, a buzzer, etc.

The vibration motor 133 may output the vibration signal. For example, the vibration motor 133 may output the vibration signal corresponding to an output of audio data or video data (for example, the call signal receiving sound, the message receiving sound, etc.) Also, the vibration motor 133 may output the vibration signal when a touch is inputted to the touch screen.

The user input unit 140 may denote a tool by which a user inputs data to control the device 100. For example, the user input unit 140 may include a key pad, a dome switch, a touch pad (a contact type capacitive method, a pressure-type resistive method, an infrared ray detection method, an surface ultrasonic conductivity method, an integral equation type tension measurement method, a piezoelectric effect method, etc.), a jog wheel, a jog switch, etc. but is not limited thereto.

The user input unit 140 may receive a user input. Also, the user input unit 140 may interact with a UI module 171 to receive the user input for selecting at least one of items displayed on the respective sensing regions of the plurality of sensors, but this is merely an embodiment. The type of the user input received by the user input unit 140 is not limited to the above-described example.

The communicator 150 may include one or more components which enable communication between the device 100 and an external device (e.g. a smart car of FIG. 12). For example, the communicator 150 may include a short-range wireless communicator 151, a mobile communicator 152, and a broadcasting receiver 153.

The short-range wireless communicator 151 may include a Bluetooth communicator, a Bluetooth low energy (BLE) communicator, a near field communicator, a wireless local area network (WLAN) or WiFi communicator, a Zigbee communicator, an infrared data association (IrDA) communicator, a Wi-Fi Direct (WFD) communicator, an ultra wideband (UWB) communicator, an Ant+ communicator, etc. but is not limited thereto.

The mobile communicator 152 may transceive wireless signals to and from at least one of a base station, an external terminal, and a server on a mobile communication network. The wireless signals may include various types of data per transceiving audio call signals, video communication call signals or text/multimedia messages.

The broadcasting receiver 153 may receive broadcasting signals and/or information related to broadcasting from the outside via broadcasting channels. The broadcasting channels may include satellite channels and ground wave channels. Depending on a type of implementation, the device 100 may not include the broadcasting receiver 153.

The A/V input unit 160 is to input audio signals or video signals, and may include a camera 161, a microphone 162, etc. The camera 161 may acquire image frames such as still images or video images via an image sensor at a video call mode or a capturing mode. Images captured by the image sensor may be processed via the controller 120 or a separate image processor (not illustrated).

The image frames processed by the camera 161 may be stored in the memory 170 or transmitted to the outside via the communicator 150. Two or more cameras 161 may be included depending on a type of the device 100.

The microphone 162 may receive external audio signals and process the audio signals into electrical audio data. For example, the microphone 162 may receive audio signals from an external device or a speaker. The microphone 162 may use various noise removing algorithms for removing noise generated in a process of receiving the external audio signals.

The memory 170 may store programs for processing and controlling of the controller 120 and also store input and output data (the first shape information of the at least one view point, the first depth information, the second shape information, and the second depth information).

The memory 170 may include at least one type of storage media such as a flash memory, a hard disk, a multimedia micro-card, a card type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. The device 100 may also operate a web storage or a cloud server performing a storage function of the memory 170 on the Internet.

Programs stored in the memory 170 may be classified into a plurality of modules per function and may be, for example, the UI module 171, a touch screen module 172, a notification module 173, etc.

The UI module 171 may provide specialized UI, graphical UI (GUI), etc., which are linked to the device 100 per application. For example, the UI module 171 may provide a user interface capable of sensing a user input as described above with reference to FIG. 10. The touch screen module 172 may sense a user's touch gesture on the touch screen and transmit information about the touch gesture to the controller 120. According to an embodiment, the touch screen module 172 may recognize and analyze touch code. The touch screen module 172 may be configured as separate hardware including a controller.

Various sensors may be arranged inside or near the touch screen for detecting the touch on the touch screen or a close touch. A tactile sensor is an example of a sensor for detecting the touch on the touch screen. The tactile sensor may sense the touch of a particular object at a level of human feeling or at a higher level than that. The tactile sensor may detect various information such as roughness of a contact surface, hardness of a contact material, and temperature of a contact point.

Also, the proximity sensor is another example of sensors for detecting the touch on the touch screen.

The proximity sensor is a sensor which detects an existence of an object approaching a certain detection surface or an object in the vicinity, without a mechanical contact, via an electromagnetic force or infrared rays. Examples of the proximity sensors are a transparence-type photoelectric sensor, a direct reflection-type photoelectric sensor, a mirror reflection-type photoelectric sensor, a high-frequency oscillation-type proximity sensor, a capacitance-type proximity sensor, a magnet-type proximity sensor, and an infrared ray proximity sensor. Various touch gestures of the user may include a tap, a touch and hold, a double tap, a drag, a fanning, a flick, a drag and drop, a swipe, etc.

The notification module 173 may generate a signal to notify an event occurrence of the device 100. An example of an event occurred in the device 100 may include an input of key signals, etc. The notification module 173 may output the notification signal in a video signal-type via the display 131 or in an audio signal-type via the audio output unit 132, or in a vibration signal-type via the vibration motor 133.

A method according to an embodiment may be realized in a program code-type executable via various computer methods and may be recorded on a computer-readable recording medium. The computer-readable recording medium may include program code, data files, data structures, etc., separately or in combinations. Program code to be recorded on such medium may be particularly designed and configured according to the present disclosure, or any readily available medium publically known to one of ordinary skill in the art of computer software may be used. Examples of the computer-readable recording media may include a hard disk, a magnetic medium such as a floppy disk and a magnetic tape, an optical medium such as a CD-ROM and a DVD, a magneto-optical medium such as a floptical disk, and a hardware apparatus, specially configured to store and execute program commands, such as ROM, RAM, and a flash memory. Examples of program code may include not only machine language code generated by a compiler but also high level language code executable by the computer via an interpreter, etc.

While the present disclosure has been particularly shown and described with reference to the embodiments thereof, it will be apparent to those of ordinary skill in the art that various changes and modifications may be readily made without departing from the scope of the present disclosure as set forth in the claims below.

The invention claimed is:

1. A method, performed by a device, of acquiring depth information of an object, the method comprising:
    acquiring first shape information of at least one view point of the object when the object is located at a first point in a common sensing region common to respective sensing regions of a plurality of sensors and first depth information of the object;
    acquiring second shape information of the object at a second point when the object is moved from the first point to the second point in a region excluding the common sensing region on the respective sensing regions of the plurality of sensors; and
    acquiring second depth information of the object at the second point based on a result of comparison between the first shape information of the at least one view point and the second shape information and the first depth information of the object,
    wherein the first shape information is sensed by the plurality of sensors and the second shape information is sensed by some of the plurality of sensors.

2. The method of claim 1, further comprising:
    selecting first shape information of a view point corresponding to the second shape information from among the first shape information of the at least view point; and
    determining a size difference of the object sensed at the first point and the second point, based on the selected first shape information and the second shape information,
    wherein the acquiring of the second depth information comprises: determining the second depth information based on the determined size difference and the first depth information.

3. The method of claim 1, further comprising: generating a three-dimensional (3D) model of the object,
    wherein the first shape information of the at least one view point is acquired from the generated 3D model of the object.

4. The method of claim 1, wherein the acquiring of the first shape information of the at least one view point comprises: when a shape of the object is deformable, acquiring the first shape information of the at least one view point according to a type of the deformable shape.

5. The method of claim 1, further comprising: when the object is located within a predetermined distance range from a boundary of the respective sensing regions of the plurality of sensors, changing a sensing region of at least one of the plurality of sensors based on a moving direction of the object.

6. The method of claim 1, further comprising:
    identifying a type of the object based on the first shape information of the at least one view point; and
    storing the first shape information of the at least one view point and the first depth information according to the identified type of the object.

7. The method of claim 1, further comprising: expanding a user interface capable of sensing an input of a user of the device set in a region of the common sensing region to the respective sensing regions of the plurality of sensors when the first shape information of the at least one view point and the first depth information are acquired.

8. A computer-readable recording medium having recorded thereon a program for executing the method of claim 1 by using a computer.

9. A device for acquiring depth information of an object, the device comprising:
  a sensing unit configured to sense the object and acquire first shape information of at least one view point of the object when the object is located at a first point in a common sensing region common to respective sensing regions of a plurality of sensors, and, when the object is moved from the first point to a second point in a region excluding the common sensing region on the respective sensing regions of the plurality of sensors, acquire second shape information of the object at the second point; and
  a controller configured to acquire first depth information of the object at the first point and acquire second depth information of the object at the second point based on a result of comparison between the first shape information of the at least one view point and the second shape information and the first depth information of the object,
  wherein the first shape information is sensed by the plurality of sensors and the second shape information is sensed by some of the plurality of sensors.

10. The device of claim 9, wherein the controller is further configured to select first shape information of a view point corresponding to the second shape information from among the first shape information of the at least view point, determine a size difference of the object sensed at the first point and the second point, based on the selected first shape information and the second shape information, and determine the second depth information based on the determined size difference and the first depth information.

11. The device of claim 9, wherein the controller is further configured to generate a three-dimensional (3D) model of the object,
  wherein the first shape information of the at least one view point is acquired from the generated 3D model of the object.

12. The device of claim 9, wherein the controller is further configured to, when a shape of the object is deformable, acquire the first shape information of the at least one view point according to a type of the deformable shape.

13. The device of claim 9, wherein the controller is further configured to, when the object is located within a predetermined distance range from a boundary of the respective sensing regions of the plurality of sensors, change a sensing region of at least one of the plurality of sensors based on a moving direction of the object.

14. The device of claim 9, wherein the controller is further configured to identify a type of the object based on the first shape information of the at least one view point, and
  wherein the device further comprises a memory storing the first shape information of the at least one view point and the first depth information according to the identified type of the object.

15. The device of claim 9, wherein the controller is further configured to expand a user interface capable of sensing an input of a user of the device set in a region of the common sensing region to the respective sensing regions of the plurality of sensors when the first shape information of the at least one view point and the first depth information are acquired.

* * * * *